United States Patent
Ramamurthy et al.

(10) Patent No.: US 10,998,727 B2
(45) Date of Patent: May 4, 2021

(54) POWER MANAGEMENT ACROSS POINT OF SOURCE TO POINT OF LOAD

(71) Applicant: Energy Harbors Corporation, Inc., Saratoga, CA (US)

(72) Inventors: Shankar Ramamurthy, Saratoga, CA (US); Robert A. Gingell, Jr., Sunnyvale, CA (US)

(73) Assignee: Energy Internet Corporation, Inc., Saratoga, CA (US)

( * ) Notice: Subject to any disclaimer, the term of this patent is extended or adjusted under 35 U.S.C. 154(b) by 0 days.

(21) Appl. No.: 16/423,245

(22) Filed: May 28, 2019

(65) Prior Publication Data

US 2019/0280483 A1    Sep. 12, 2019

Related U.S. Application Data

(63) Continuation-in-part of application No. 16/378,243, filed on Apr. 8, 2019, which is a continuation-in-part of application No. 16/118,886, filed on Aug. 31, 2018.

(60) Provisional application No. 62/838,992, filed on Apr. 26, 2019, provisional application No. 62/795,140, filed on Jan. 22, 2019, provisional application No. 62/795,133, filed on Jan. 22, 2019, provisional application No. 62/784,582, filed on Dec. 24, 2018, provisional application No. 62/679,051, filed on Jun. 1, 2018, provisional application No. 62/654,859, filed on Apr. 9, 2018, provisional application No. 62/654,718, filed on Apr. 9, 2018, provisional (Continued)

(51) Int. Cl.
*H02J 3/28* (2006.01)
*H02J 3/14* (2006.01)
*H02J 3/06* (2006.01)
*H02J 3/00* (2006.01)

(52) U.S. Cl.
CPC ............... *H02J 3/28* (2013.01); *H02J 3/005* (2013.01); *H02J 3/06* (2013.01); *H02J 3/14* (2013.01)

(58) Field of Classification Search
CPC ........ H02J 3/28; H02J 3/14; H02J 3/06; H02J 3/005
See application file for complete search history.

(56) References Cited

U.S. PATENT DOCUMENTS 9,540,957 B2   1/2017  Shinnar et al.
9,562,183 B2   2/2017  Hidalgo et al.
(Continued)

*Primary Examiner* — Ziaul Karim
(74) *Attorney, Agent, or Firm* — Adams Intellex, PLC

(57) ABSTRACT

Disclosed techniques include power management across point of source to point of load. Energy is obtained from points of energy generation, where data obtained at a time of energy generation includes information on energy and metadata about the energy. Connection is enabled from the points of energy generation to a large-scale energy storage subsystem. Load information is received from points of load, where the points of load are connected to an energy grid. Processors are used to calculate an energy control policy, based on information on the energy, the energy metadata, availability of the large-scale energy storage subsystem, and the load information. Routing of the energy is controlled from the points of energy generation to the points of load based on the energy control policy. The large-scale energy storage subsystem is controlled based on the energy control policy.

25 Claims, 15 Drawing Sheets

Related U.S. Application Data application No. 62/645,859, filed on Mar. 21, 2018, provisional application No. 62/552,747, filed on Aug. 31, 2017.

(56) References Cited

U.S. PATENT DOCUMENTS

| | | |
|---|---|---|
| 9,568,235 B2 | 2/2017 | Dobbs |
| 9,631,846 B2 | 4/2017 | Chen et al. |
| 9,651,030 B2 | 5/2017 | Kim et al. |
| 9,664,140 B2 | 5/2017 | Kalika |
| 2006/0276938 A1* | 12/2006 | Miller ................ H02J 3/14 700/295 |
| 2008/0046387 A1* | 2/2008 | Gopal ................ G01D 4/004 705/412 |
| 2008/0071705 A1 | 3/2008 | Enis et al. |
| 2008/0172279 A1* | 7/2008 | Enis ................ F03D 17/00 705/7.25 |
| 2010/0235008 A1* | 9/2010 | Forbes, Jr. ............ B60L 53/14 700/291 |
| 2010/0292861 A1* | 11/2010 | Tsai ................ G06F 1/266 700/296 |
| 2010/0308765 A1* | 12/2010 | Moore ................ H02J 7/342 320/103 |
| 2014/0039710 A1 | 2/2014 | Carter et al. |
| 2014/0121898 A1* | 5/2014 | Diab ................ H04L 67/18 701/36 |
| 2014/0129042 A1* | 5/2014 | Miner ................ G05B 13/02 700/296 |
| 2017/0005515 A1 | 1/2017 | Sanders et al. |
| 2017/0038157 A1 | 2/2017 | O'Donnell et al. |
| 2017/0044414 A1 | 2/2017 | Sutterlin et al. |
| 2017/0067667 A1 | 3/2017 | Choi |
| 2017/0082060 A1 | 3/2017 | Kalika |
| 2017/0082380 A1 | 3/2017 | Gauche et al. |
| 2017/0159495 A1 | 6/2017 | Laughlin et al. |

* cited by examiner

POWER MANAGEMENT ACROSS POINT OF SOURCE TO POINT OF LOAD

RELATED APPLICATIONS

This application claims the benefit of U.S. provisional patent applications "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, "Energy Management Using Electronic Flywheel" Ser. No. 62/795,133, filed Jan. 22, 2019, and "Energy Transfer Through Fluid Flows" Ser. No. 62/838,992, filed Apr. 26, 2019.

This application is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to energy management and more particularly to power management across point of source to point of load.

BACKGROUND

Government agencies, energy producers, and responsible energy consumers enforce, initiate, and practice energy conservation measures, respectively. Conservation techniques can be simple and effective habits such as turning off unneeded lights when leaving a room, or adjusting the thermostat lower in winter and higher in summer. Purchasing energy-efficient appliances or vehicles is another common approach. Despite these conservation efforts, energy demands of all types continue to increase and often exceed energy supply. Growth of towns, cities, states, and countries increases the demand for energy of all kinds, resulting in what is now considered by many analysts to be an energy crisis. There are many root causes for the energy demand increases. Overconsumption of energy imposes strains on natural resources ranging from fossil fuels to renewables, or biofuels such as wood chips, resulting increased environmental pollution and fuel shortages. Population growth, and providing electricity to previously underserved or unserved regions, put further strains on energy sources. Population growth increases the numbers of energy consumers who want to perform daily tasks such as washing, cooking, entertaining, illuminating, and heating and cooling of their houses and apartments. Beyond the domestic use, increases in energy demand result from public projects and expanded economic activities such as manufacturing, transportation, and retail, among many.

Energy distribution problems are a primary hindrance to solving the energy crisis. Inadequate energy distribution infrastructure, and aging energy generation sources and equipment, cannot keep pace with the new and emerging energy demands. Renewable energy options remain largely unexplored or underdeveloped. Landowners and others who live adjacent to proposed energy generation sites often wage vehement resistance to the construction of windmills, solar farms, or wood burning plants. Further, when plans can be made to construct new energy producing facilities, distribution of the energy is stymied by the poor distribution infrastructure. Commissioning of new energy generation facilities remains a nearly intractable goal. Legal wrangling, construction delays, pollution mitigation requirements, overwhelming costs, or war, have prevented, halted, or delayed bringing new energy generation facilities online. Energy wastage is another major culprit. Aging appliances or manufacturing equipment, incandescent light bulbs, and poor building insulation and air sealing, all waste energy in comparison to their modern counterparts.

To meet the increases in energy demands of all types, public officials and city planners have been confronted with choosing among three broad design or policy choices: to increase energy production through building new power plants, to reduce energy demand through energy conservation measures, or to combine both of these methods. An increasingly popular energy production option is to source energy based on renewable energy production such as solar, wind, geothermal, wave action, tidal, and so on. Perhaps the primary limitation to sole reliance on renewable energy sources is the sporadic nature of these energy sources. For example, solar sources produce energy only in the presence of light. Further, the amounts of energy produced vary depending on the intensity of the light hitting the photovoltaic panels. Energy sources and energy demands must be balanced so that clean and reliable energy is consistently available to all consumers countrywide.

SUMMARY

Energy can be produced by diverse and disparate generation sources. The difference between energy production and energy consumption typically increases or decreases over a given period of time. These differences can further depend on a timeframe such as day versus night, day of the week, manufacturing schedules, seasonal factors such as heating or cooling, and so on. The deficiencies indeed can be significant and at times critical. The deficiencies can be correlated to time-dependent energy demands, changeable energy production capabilities such as the presence or absence of a renewable resource used to generate the energy, available capacity of commercial or grid power, the amount of standby or backup energy, and so on. To ameliorate the energy production/consumption asymmetry, energy excess to demand at a given time can be stored and used at another time. The stored energy can be sourced when demand exceeds a given power level. Energy can be collected and stored when a renewable resource is available, when the energy available exceeds the energy needed, or even when the cost of production of the energy is relatively inexpensive. The stored energy can be used to augment available energy or instead to provide the amount of energy that is needed during periods of increased or unmet energy need. The recovery of stored energy can be applied to low-level energy demand scenarios, such as the energy needs of a house or small operation such as a farm, to larger scale energy needs such as manufacturing, or to the largest energy needs of an energy distribution grid.

Disclosed techniques address power management across point of source to point of load. Energy is obtained from one or more points of energy generation. Data obtained at a time of energy generation includes information on energy and metadata about the energy. Connection from the one or more points of energy generation to a large-scale energy storage subsystem is enabled. Load information from one or more points of load is received, where the one or more points of load are connected to an energy grid. One or more processors are used to calculate an energy control policy, based on information on the energy, the energy metadata, availability of the large-scale energy storage subsystem, and the load information from one or more points of load. Routing of the energy from the one or more energy points of generation to the one or more points of load is controlled based on the energy control policy. The routing is enabled by software control of the energy grid.

A method for energy management is disclosed comprising: obtaining energy from one or more points of energy generation, wherein data obtained at time of energy generation includes information on energy and metadata about the energy; enabling connection from the one or more points of energy generation to a large-scale energy storage subsystem; receiving load information from one or more points of load, wherein the one or more points of load are connected to an energy grid; calculating an energy control policy, based on information on the energy, the energy metadata, availability of the large-scale energy storage subsystem, and the load information from one or more points of load; and controlling routing of the energy from the one or more points of energy generation to the one or more points of load based on the energy control policy. Some embodiments comprise controlling the large-scale energy storage subsystem based on the energy control policy. In embodiments, the large-scale energy storage subsystem includes compressed air energy storage. In embodiments, the compressed air is compressed using one or more water pumps. Other embodiments comprise controlling access to the one or more points of energy generation based on the energy control policy. In embodiments, the one or more points of energy generation include a renewable energy source.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
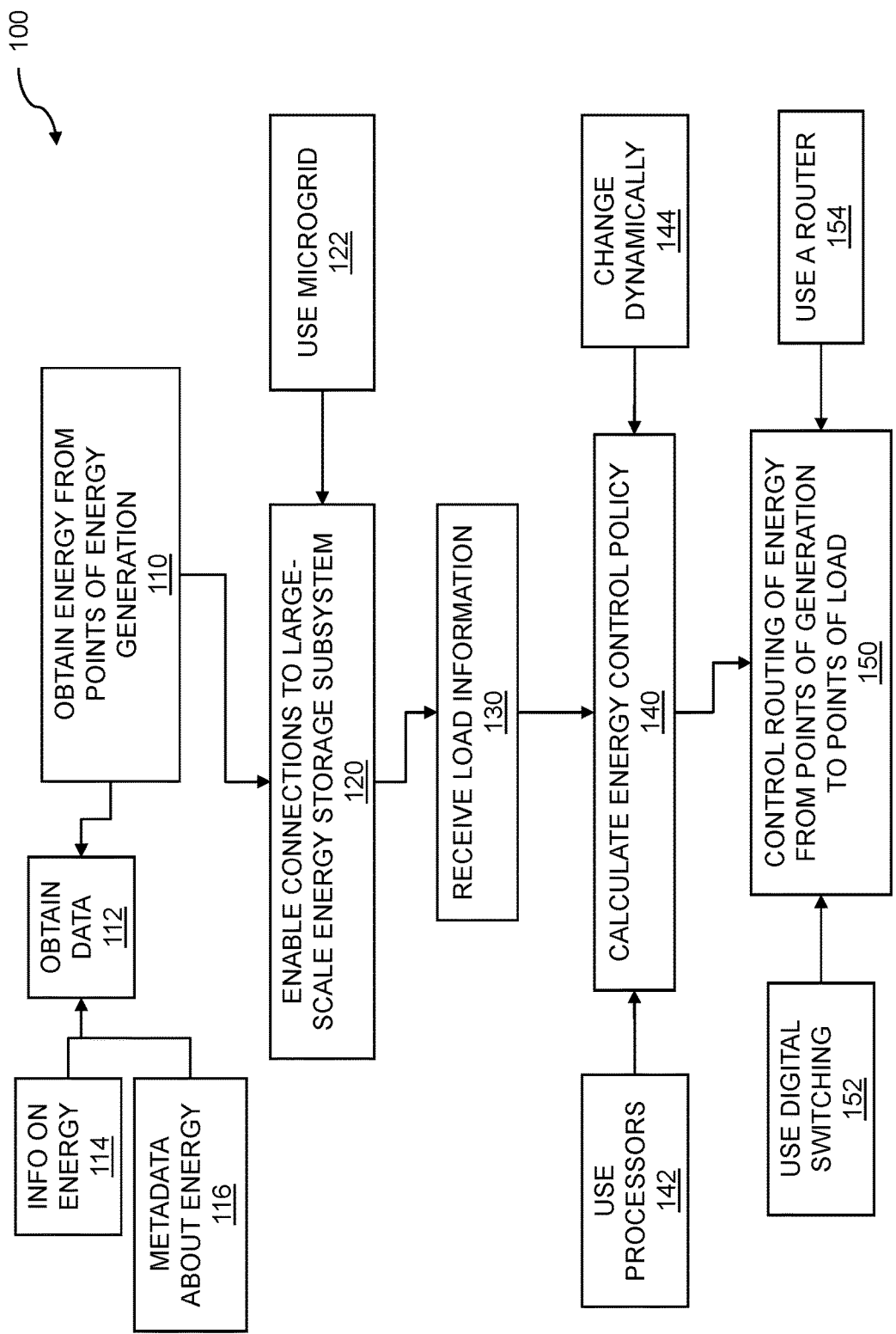
FIG. 1 is a flow diagram for power management across point of source to point of load.

This disclosure provides techniques for power management across point of source to point of load. The power management comprises end-to-end management of one or more sources to one or more loads on a software-defined energy grid. The power management is based on a large-scale energy storage subsystem which can store energy from one or more points of generation, and can provide energy to one or more points of load. The large-scale energy storage subsystem can receive energy from diverse and disparate energy sources. The large-scale energy storage subsystem can store energy when the amount of energy available from the points of generation exceeds the energy demand of the points of load. The energy can be stored for a period of time. The large-scale energy storage subsystem includes electrical energy storage using batteries or capacitors. The large-scale energy storage subsystem can include multiple pressurized storage elements such as compressed air storage elements. Managing the sourcing, storing, and extracting of energy is a complex and highly challenging task. Power management can be influenced by many factors including the weather, varying energy demand, variable pricing schemes, and so on. Power management can be further complicated by quickly changing customer energy demands, requirements of service level agreements (SLAs), etc. Despite the growing use of renewable energy resources such as solar, wind, wave action, tidal, geothermal, biogas, and the like, two significant challenges remain: the amount of energy produced by a given renewable energy source is highly variable, and the availability of the renewable energy source is inconsistent. As an example, wind energy is only available when wind is present, solar energy only when the sun is shining, wave action energy only when there is wave action, and so on.

Energy with intermittent availability can be stored or cached when the energy is being produced, and can be extracted at a later time when the stored energy is needed. A similar strategy can be used based on price, where energy is stored when production cost is low, then later extracted when the energy production cost is high. The stored energy can be used in combination with other energy sources such as grid power or microgrid (local) power to meet energy demands at given times. Storage can include a period of time, where the period of time can be a short-term basis or a long-term basis. Energy losses are introduced when converting energy from one energy type to another energy type. Further losses occur when storing energy, extracting energy, routing energy, etc. Minimizing the energy losses is critical to any energy storage and retrieval/recovery technique. Electrical energy storage is possible using techniques such as mature storage battery technologies, but the costs of large battery banks are prohibitive in terms of up-front cost and maintenance costs. Further, batteries are problematic for long-term storage purposes because of charge leakage. Thus embodiments can comprise augmenting an energy supply with a storage-smoothed intermittent renewable energy source, wherein the smoothing is provided by a large-scale energy storage subsystem.

In disclosed techniques, energy management uses power management across point of source to point of load. Energy from points of energy generation can be obtained locally using a microgrid or from farther afield using a grid. The energy can be generated using fuels such as coal, natural gas, or nuclear sources; using hydro power or geothermal energy; using renewable sources such as solar, wind, tidal, wave-action, biofuels or biogas; using pump-turbine sources such as compressed air, steam, or ice; or using backup power sources such as diesel-generator sets; and so on. Connections are enabled from the one or more points of energy generation to a large-scale energy storage subsystem. The large-scale energy storage subsystem can store electrical energy, potential energy, thermal energy, kinetic energy, etc. Load information is received from one or more points of load, where the one or more points of load are connected to an energy grid. The load information can include energy requirements, timing of the energy requirements, priorities, and the like. One or more processors are used to calculate an energy control policy, based on information on the energy, the energy metadata, the availability of the large-scale energy storage subsystem, and the load information from one or more points of load. The energy control policy can be used to control the large-scale energy storage subsystem, to access to the one or more points of energy generation, and so on. The energy policy can change dynamically based on changing processing loads, energy requirements, availability of points of energy generation, and the like. The energy control policy can include a safety policy, where the safety policy can include rules and procedures to protect life, property, and electrical equipment. Routing of the energy from the one or more points of energy generation to the one or more points of load is controlled based on the energy control policy. The routing can be accomplished using a router, where the router can include a network of digital switches. The digital switches, which can replace analog switches, can be activated based on the energy control policy.

FIG. 1 is a flow diagram for power management across point of source to point of load. The power management is end-to-end from one or more sources to one or more loads on a software-defined energy grid. Energy storage and management can be based on a large-scale energy storage subsystem. The large-scale energy storage subsystem can store various forms of energy such as electrical energy using batteries or capacitors, potential energy using a pump-energy storage subsystem, and so on. The energy storage subsystems can include multiple batteries or capacitors, pressurized storage elements such as high-pressure water, pressurized air, steam, and the like. Energy is obtained from one or more points of energy generation, where data obtained at a time of energy generation includes information on energy and metadata about the energy. Connection is enabled from the one or more points of energy generation to a large-scale energy storage subsystem, where the connection includes an energy grid. One or more processors are used to calculate an energy control policy, based on information on the energy, the energy metadata, availability of the large-scale energy storage subsystem, and the load information from one or more points of load. Routing of the energy from the one or more points of energy generation to the one or more points of load is controlled based on the energy control policy.

A flow 100 for power management across point of source to point of load is shown. Energy can be stored and retrieved or extracted from a large-scale energy storage subsystem. The large-scale energy storage subsystem can be based on battery storage, capacitor storage, inductive storage, compressed air storage, steam or ice storage, and so on. The energy storage subsystem can include a pump-turbine storage subsystem. A pump-turbine storage subsystem can include energy storage elements such as high-pressure chambers, compression-expansion chambers, compressed air chambers, and so on. A pump-turbine energy management system can be implemented within a non-productive oil well infrastructure, unused salt caverns, aquifers, large cavities underground, or porous rock structures capable of holding air or water under pressure. The storage modules of a large-scale energy storage subsystem can store various energy types including electrical energy, thermal energy, kinetic energy, mechanical energy, hydraulic energy, and so on. The flow 100 includes obtaining energy from one or more points of energy generation 110. Various types of energy generation can be included in the points of energy generation. The points of energy generation can include conventional or traditional power plants such as those plants which generate energy based on fuels including coal, natural gas, or nuclear fuels, and so on. The points of energy generation can include power plants based on hydro power or geothermal power. The points of energy generation can include alternative or "eco-friendly" energy production techniques including solar, wind, tidal, wave action, biogas, and the like. The points of energy generation can include plants that generate energy using bio-fuels. Data can be obtained 112 at a time of energy generation. The data can include information on energy 114. Information on energy can include an amount of power available, time of availability, cost, etc. Data obtained at a time of energy generation can include metadata about the energy 116. Metadata about the energy can include name of the energy source, location of the energy source, owner or agent of an energy source, energy source preferences such as ecofriendly energy sources, and the like.

The flow 100 includes enabling connection from the one or more points of energy generation to a large-scale energy storage subsystem 120, where the connection includes an energy grid. The large-scale energy storage subsystem can store one or more types of energy. The large-scale energy storage system can comprise electrical energy storage including techniques such as using batteries or capacitors. The large-scale energy storage subsystem can include pump-energy storage, compressed gas storage, liquid storage such as hydraulic head, steam, liquid nitrogen, ice, and so on. The energy grid can include a microgrid 122 used for onsite energy generation, storage, recovery, distribution, etc. The energy grid can include a local grid used for energy distribution within a community, town, or city; a regional grid used for energy distribution across a state or a plurality of states; a national grid; and so on. The energy grid can include a degenerate, or trivial, grid. A degenerate grid can comprise a microgrid connection between a single store and a single load. Thus in embodiments, the degenerate grid can comprise a single store, a single load, and a single connection between them. In other embodiments, the degenerate grid comprises two or more redundant connections between a single store and a single load.

The energy grid can include a complex, hierarchical network of grids comprising one or more microgrids in distinct installations or locations connected by a higher level energy grid, such as a regional energy grid or a national energy grid. The regional or national energy grids can include a traditional electrical distribution grid run by an established company or cooperative, such as the California ISO grid, which is a nonprofit public-benefit corporation. However, the regional or national grids can also include new, non-traditional, and even private grids that often distribute energy in the form of electricity, but can also distribute energy in other forms, such as in the form of a compressed, rarefied, heated, or cooled fluid. A first energy microgrid installation can be distinct from a second energy microgrid installation based on grid physical location, grid ownership, grid management control, and so on. The first energy microgrid and the second energy microgrid can be implemented on separate but adjacent properties, in separate towns, in separate states, in separate countries, and so on. The first energy microgrid and the second energy microgrid can be owned, operated, and/or managed by the same entity, by different entities, by related entities, by competing entities, and so on. The first energy microgrid and the second energy microgrid can be part of a plurality of energy microgrids.

A power management infrastructure can be employed to manage the flow of energy across a plurality of energy microgrids. Each of the plurality of energy microgrids can be coupled to one or more large-scale energy storage subsystems. Energy can be routed between or even among each of the plurality of energy microgrids, thus enabling transfer of energy between or among the one or more large-scale energy storage subsystems coupled thereto. The routing, the enabling, and/or the transferring can be controlled and/or managed by the power management infrastructure. The power management infrastructure can be guided by one or more energy control policies. The energy control policy or policies can be based on availability, demand, energy costs, energy service level agreements, reliability, distribution costs, and so on. For example, the power management infrastructure can temporarily supply energy from a large-scale energy storage subsystem on one local energy grid to a load on a different local energy grid. In embodiments, two or more energy entities or agents can have their energy needs and supplies arbitrated by the power management infrastructure. In embodiments, the energy control policy is used to enable energy transfer between distinct energy microgrids.

The flow 100 includes receiving load information 130 from one or more points of load, where the one or more points of load are connected to the energy grid. The load information that is received can include an amount of energy required by a load, a time at which the energy is required, a duration of time for providing the energy, and so on. The load information can include one or more priorities for the loads. The priorities of the loads can be based on one or more service level agreements. The load application can be based on application or processing job mix. The load information can be dynamic, where the load information can be based on time of day, day of week, week of month, month of year, season, and so on. The load information can include specifications about which loads can be "hot swapped". Loads can be hot swapped or "hot plugged" if a given load can be swapped out and another load swapped in without requiring a shutdown of an energy distribution system or subsystem to do so. For example, a server can be hot swappable it the server can be removed or "swapped out" and another server installed or "swapped in" without requiring a shutdown of the energy distribution system which provides energy to the server. Similarly, energy sources can be hot swapped or hot plugged if one source can be removed and another source installed without requiring a shutdown of the energy source system or subsystem.

The flow 100 includes calculating an energy control policy 140, information on the energy, the energy metadata, availability of the large-scale energy storage subsystem, and the load information from one or more points of load. The energy control policy can include determining which points of energy generation can or should be routed to energy points of load. The control policy can be based on a priority for the one or more points of load. Priority can range from high priority energy points of load, critical points of load, etc., to low priority points of load. The calculating the energy control policy can be based on one or more service level agreements (SLAs). The calculating can be performed using one or more processors 142. The processors can include one or more local servers, remote servers, cloud-based servers, distributed servers, mesh servers, etc. An SLA can include amounts of energy needed, time of energy needs, etc. The energy needs can be based on processing job mix. In embodiments, the energy policy can change dynamically 144. Changes in the energy policy can be based on a time of day, a day of week, a day or month, seasonal requirements such as cooling requirements, and so on. In embodiments, the energy policy includes a safety policy. The safety policy can include the safety of people and property, the safety of the points of energy generation and the points of energy load, safety of switching equipment, and so on. The calculating the energy control policy can further include energy load analysis on a "per socket" basis. A per socket analysis can be used to determine which pieces of electrical equipment can be energized or not energized within an information technology (IT) rack, a row of IT racks, a datacenter, and so on. The per socket analysis can include "wall sockets," where the wall sockets can include electrical outlets within an office, an equipment closet, a machine room, a datacenter, etc. The per socket energy control can be based on service level agreements, energy costs, points of energy generation availability, and so on.

The flow 100 includes controlling the routing of the energy from the one or more points of energy generation to the one or more points of load 150 based on the energy control policy. The routing of energy from the one or more points of energy generation to the one or more points of energy load can include configuring a network of switches. In embodiments, the controlling of routing is accomplished using digital switching 152 techniques. The digital switches can be enabled or disabled by executing a control policy using the one or more processors. The digital switches can be used to enable a path from one or more points of energy generation to a given point of load. A digital switch can replace an analog switch as part of using digital switching techniques. Digital switches and analog switches can be used for the routing. In embodiments, enabling the connection can be accomplished using digital switching techniques. The digital switching techniques can include programming the digital switches. In embodiments, the controlling of routing can be accomplished using a router 154. A router can include various configurations of switches including the network of digital switches. In further embodiments, the controlling of the routing can include injecting further energy from a second energy point of generation using the router. The injecting further energy can be based on energy needs of the energy load in excess of the energy resources available from a single energy source, an SLA that ensures a second energy source is available if the first energy source goes offline, etc.

In addition to energy being provided by the one or more points of energy generation, energy can be provided by the large-scale energy storage subsystem. In embodiments, a further energy policy can be used to enable the connection of the large-scale energy storage subsystem. The large-scale energy storage subsystem can be used to store excess energy, to provide energy to make up the difference between the amount of generated energy available and the amount of energy needed by the energy points of load, and so on. The further energy policy can be used for providing energy during a grid outage. Energy from the large-scale energy storage subsystem can provide energy based on other criteria such as cost. In embodiments, the at least one of the one or more points of load can be controlled based on load pricing requirements. When energy costs are high, low priority points of load can be disabled. Further when energy costs low, energy can be stored in the large-scale energy storage subsystem. When the energy costs become high, energy points of load including low priority energy points of load can be enabled by using stored energy from the large-scale energy storage subsystem. Further to load pricing requirements, energy can be routed to the one or more points of energy load based on other criteria. In embodiments, the controlling of routing of the energy to the points of load can be based on ranking loads. Loads can be ranked from high priority to low priority. High priority loads can have energy routed to them first, while lower priority loads may receive all, some, or none of their energy needs based on what, if any, energy is surplus to the high priority load needs. In other embodiments, the routing of energy can be based on contract terms which require that certain amounts of energy be routed to the loads. The contract terms can include a maximum number of outage minutes, a maximum number of outages per year, and so on. The contract terms can be determined based on one or more service level agreements (SLAs), dynamic SLAs, and so on. The controlling of routing of energy loads can also be based on pricing criteria, such as high priority loads receiving energy even if energy costs are high, low priority loads receiving energy only if energy costs are low, etc.

The energy points of load can be controlled based on various criteria. Whether energy can be provided by the one or more energy points of load and/or by the large-scale energy storage subsystem is based on energy availability. In embodiments, the at least one of the one or more points of load is controlled based on energy availability. When energy is available, and if a given point of load has sufficient priority, then energy can be routed to the point of load. In other embodiments, the at least one of the one or more points of load can be controlled based on energy management policy requirements. The energy management policy requirements can include policies for using a given energy point of generation, hours of use of pieces of electrical equipment such as digital switches, charge state of batteries or capacitors used for electrical storage by the large-scale energy storage subsystem, etc. In embodiments, the at least one of the one or more points of load can be controlled based on energy distribution requirements. The energy distribution requirements can include use of one or more grids, use of particular energy points of generation, etc. The at least one of the one or more points of load can be controlled based on seasonal load requirements. Seasonal load requirements can include increased cooling requirements during hot months, increased lighting requirements during months with fewer daylight hours, etc. Seasonal load requirements can also be based on processing requirements such as increased processing of financial transactions during the holidays. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
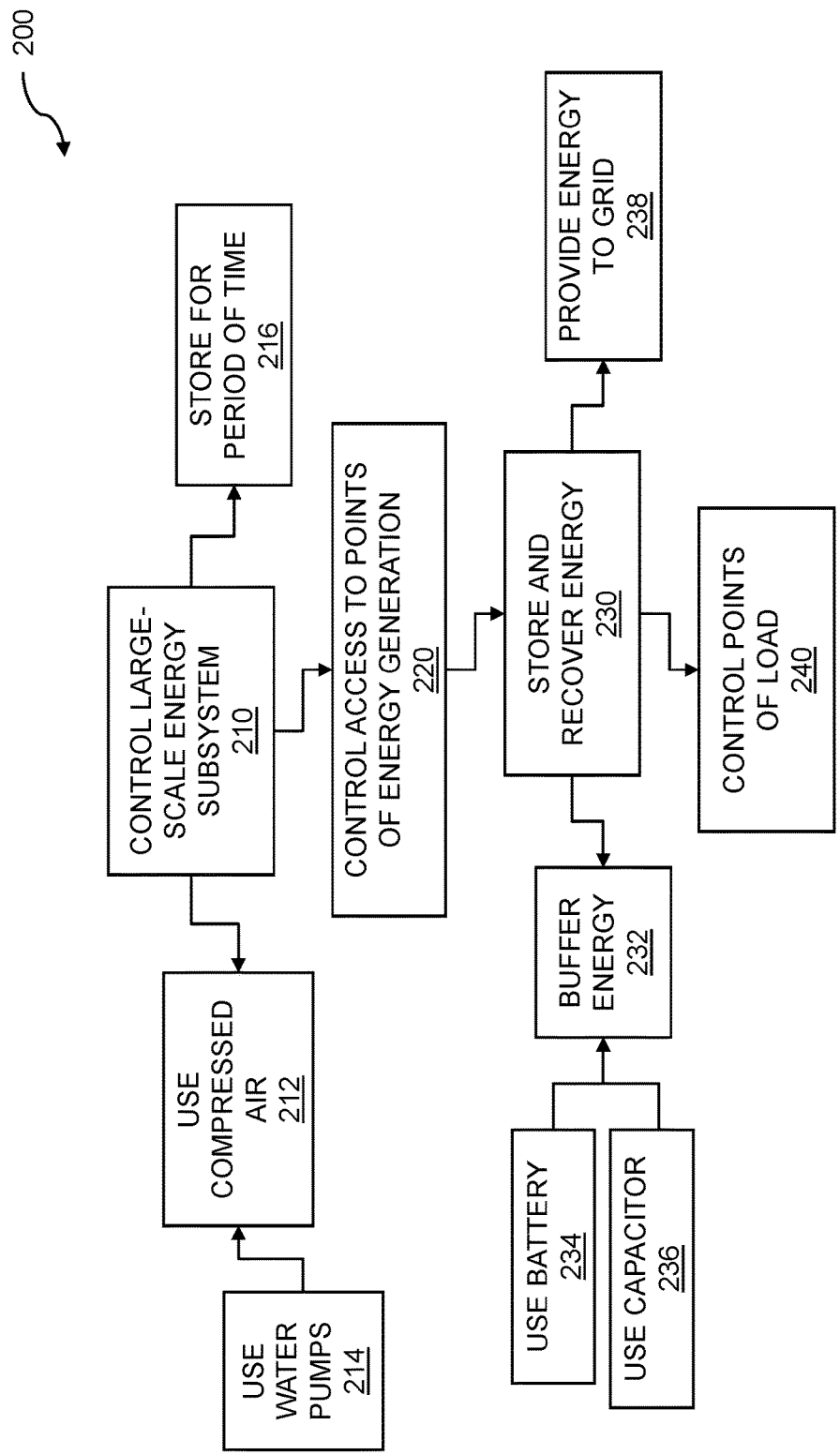
FIG. 2 is a flow diagram for controlling a large-scale storage subsystem.

FIG. 2 is a flow diagram for controlling a large-scale storage subsystem. A large-scale energy storage subsystem can store energy, for various time periods, from one or more points of energy generation. The large-scale energy storage subsystem can store electrical energy; potential energy as a compressed gas such as air; thermal energy in steam, ice, liquid nitrogen, solid nitrogen; and so on. The large-scale energy storage subsystem can provide energy to one or more points of load based on an energy control policy. The energy control policy can be used to control the routing of energy from points of energy generation, the large-scale energy storage system, etc., to points of load.

The flow 200 includes controlling the large-scale energy storage subsystem 210 based on the energy control policy. The controlling can include obtaining energy generated by the one or more points of energy generation. The energy that can be stored can include electrical energy, thermal energy, kinetic energy, mechanical energy, and so on. In embodiments, the large-scale energy storage subsystem includes compressed air energy storage 212. The air or another gas can be compressed using a pump-turbine or other technique. The compressed air can be stored in high pressure tanks, can be compressed indirectly by pumping in high pressure water, and so on. In embodiments, the compressed air can be compressed using one or more water pumps 214. In other embodiments, the compressed air can be kept under compression by a column of water located above a container holding the compressed air. The large-scale energy storage subsystem can store energy for a period of time 216, where the period of time can be a short-term period of time such as minutes, hours, or a day, or a long-term period of time such as days, weeks, months, years, etc. In embodiments, the period of time can be based on a time-of-day usage value. For example, a large-scale energy storage subsystem can comprise a large underground cavern pressurized to 200+ atmospheres, which would allow a large industrial load to continue to operate at typical consumption for days or weeks. A large-scale energy storage subsystem can provide energy consumers, such as large industries and even energy grids, enough energy to supply their typical load usage for durations ranging from 12 hours to 50 days. The providing is based on what resources are used to provision the storage capacity and the service level agreements (SLAs) governing their management. A large-scale energy storage subsystem's energy can be converted in a controlled fashion, a process called electrical fusion, into a power stream on the order of 100 Mw for up to 50 days. The intent of a large-scale energy storage subsystem is to overcome any practical objections or limitations to intermittent sources of renewable energy. For example, a large-scale energy storage subsystem could supply energy to supplement a solar energy "farm" for 50 days of severely limited sunshine, such as when a volcano like Krakatoa expels enough dust and debris into the atmosphere to significantly limit the photonic energy reaching solar energy farm arrays. The large-scale energy storage subsystem can include more than just electrical storage devices such as batteries or capacitors. In embodiments, the large-scale energy storage subsystem includes non-electrical storage devices, such as a pressurized underground cavern or unproductive oil well.

The flow 200 includes controlling access to the one or more points of energy generation 220 based on the energy control policy. As discussed throughout, the points of energy generation can include traditional power plants fueled by coal, natural gas, hydro, geothermal, nuclear, and similar sources. In embodiments, the one or more points of energy generation can include a renewable energy source such as biogas. Renewable energy sources can be small-scale such as onsite sources, large-scale such as community sources, and so on. In embodiments, the renewable energy source can include one or more of a solar farm, a wind turbine farm, a tidal energy system, a wave energy system, a geothermal system, a biofuel system or a biogas system. The one or more energy points of generation can include backup power such as one or more diesel-generator sets.

The flow 200 further includes storing and recovering energy from the large-scale energy storage subsystem 230. The recovering energy from the large-scale energy storage subsystem can include using a type of energy directly such as using electrical energy; converting from one energy form to another energy form such as using compressed air, water, or steam to spin a turbine to generate electricity; and so on. Embodiments include buffering energy recovered from the large-scale energy storage subsystem 232. The buffering can include providing energy when energy load exceeds energy generation, storing energy when energy generation exceeds energy load, and the like. The buffering can include providing energy while energy sources are being switched, such as switching from grid power to local power during a power outage. In embodiments, the buffering energy recovered from the large-scale energy storage subsystem can use a battery 234 storage subsystem. The batteries can provide power when load exceeds generation, can store power when generation exceeds load, and so on. DC energy can be converted to AC energy. In other embodiments, the buffering energy recovered from the large-scale energy storage subsystem can use capacitor 236 storage. Capacitors such as supercapacitors can be used to store or provide energy. The capacitors can be used in addition to the batteries or instead of the batteries. Further embodiments include providing energy recovered from the large-scale energy storage subsystem to the energy grid 238. The energy grid can include an on-site grid such as a microgrid, a local grid, a regional grid, a national grid, and so on. In embodiments, the energy recovered can be provided to more than one grid.

The flow 200 includes controlling the at least one of the one or more points of load 240 based on availability of the energy recovered. Various scenarios can be imagined for controlling the one or more points of load. The points of load can be controlled based on an amount of energy available. For a given amount of energy available, energy can be provided to energy loads based on priority. High priority loads can receive energy to cover all energy requirements while low priority loads can receive less energy, or even no energy, by disconnecting the loads. The amount of energy delivered to a given energy load can be based on the amount of energy available, on one or more service level agreements (SLAs), and so on. Further to priorities, based on energy point of load priority or SLA, more than one point of energy generation can be routed or connected to a high priority load. At certain times, no point of energy generation may be available to a low priority load. In embodiments, the at least one of the one or more points of load is controlled based on application-based availability requirements. Applications, such as financial transaction applications, medical record processing, security applications, and so on, can be ranked based on degree of importance, amount of resources such as processing resources required, and the like. High priority applications can be addressed by service level agreements which ensure an amount of energy, an amount of uptime, a maximum number of outages per year, and so on. A higher quantity of energy can be provided to processors and other equipment needed for high priority applications, while lower priority applications can be provided less energy (e.g. executed at lower processor speed), or delayed. In embodiments, the application-based availability requirements determine time-of-day usage. The time-of-day usage can be applied to applications, electrical equipment such as lighting; heating, ventilating, and air conditioning (HVAC); and the like. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
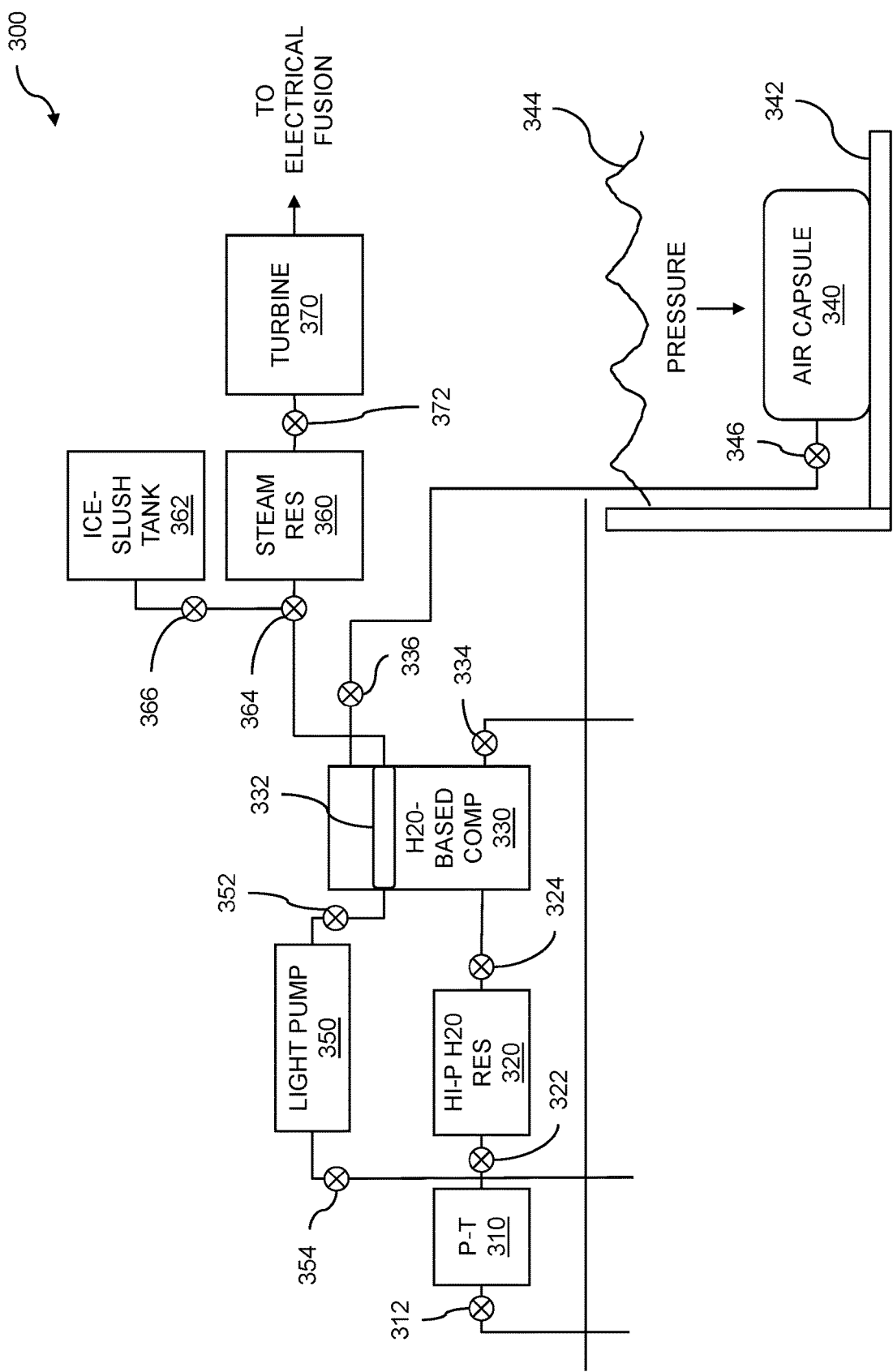
FIG. 3 illustrates pump-energy storage.

FIG. 3 illustrates pump-energy storage 300. Pump-energy storage supports power management across point of source to point of load. Pump-energy storage comprises various modules which can store energy of various types. Energy from points of generation is obtained along with information and metadata. Connections are enabled from the points of energy generation to a large-scale energy storage subsystem. Load information is received, and an energy control policy is calculated. Routing of energy from points of generation to points of load is controlled based on the policy. The types of energy that can be stored can include electrical energy, thermal energy, kinetic energy, mechanical energy, and so on. Pump-energy storage can include a pump-turbine 310. The pump-turbine can be used to pressurize a storage vessel such as a tank, capsule, bladder, and so on. The pump-turbine can be operated electrically to move or pressurize a liquid or gas. The pump-turbine can also be operated by releasing pressure from the storage vessel for stored energy extraction. The pump-energy storage can include a high-pressure water reservoir 320. The high-pressure water reservoir can be used to provide pressurized water which then can be used to exert pressure on a gas such as air, nitrogen, etc. The pump-energy storage can include water-based high compression 330. The water-based high compression can be accomplished with a vessel such as 330, where water (at the bottom of the vessel) is isolated from a gas such as air (at the top of the vessel) by an interface, barrier, membrane, sack, and so on. The high-pressure water from the high-pressure water reservoir can be used to increase the volume of pressurized water in the reservoir 330 thus increasing the pressure of the air. The water-based compression can include a heat exchanger 332. As the pressure of the air at the top of 330 is increased, the temperature of the air can be increased. The exchanger can be used to extract and store that waste heat from the air. A light pump 350 can be used to move the heat extracted from the water-based compression. In embodiments, the heat exchanger can include a water heat exchanger. The light pump can move the heated water for storage.

The pump-energy storage can include an air capsule 340. The air capsule can be located on land, at the bottom of a body of water 342, beneath a seabed, in an unused oil infrastructure such as an oil well, etc. The air capsule can be pressurized by hydraulic head. The hydraulic head can be determined by the distance between the surface of the body of water 344 and the bottom of the body of water 342. The body of water can include fresh water or seawater. In embodiments, the distance between the water surface and the bottom can be 100 meters or greater. The pump-energy storage can include storage for thermal energy. Thermal energy can be stored in a steam reservoir 360 as heat, in an ice-slush tank 362 as cold, and so on. The pump-energy storage can include a turbine 370. Steam from the steam reservoir can be used to spin a turbine to generate electricity. The generated electricity can be returned to an electrical grid, distributed to an electrical micro-grid, used on-site to meet energy demand, and so on.

The pump-turbine 310, high-pressure water tank 320, water-based high compression chamber 330, air capsule 340, ice-shush tank 362, steam reservoir 360, turbine 370, light pump 350, and other pump-energy storage elements can be interconnected using pipes, lines, hoses, etc. The flow of air, water, steam, cold water (from the ice-slush), refrigerant, and so on, can be controlled by valves. Valve 312 enables water to enter or leave the pump-turbine 310. Valve 322 couples the pump-turbine to the high-pressure reservoir 320 for water flow. Valve 324 enables high-pressure water flow between the high-pressure water reservoir and the water-based compression chamber 330. Valve 352 enables liquid (water, refrigerant, etc.) to flow between the heat exchanger 332 and the light pump 350. Valve 354 enables liquid to enter or leave the light pump. Valve 334 enables water to enter (charge) or leave (discharge) the water-based compression chamber. Valves 336 and 346 enable the flow of pressurized air from the water-based compression chamber 330 to the submerged air capsule 340. Valve 364 enables flow of water from the heat exchanger 332 to the steam reservoir 360 when the water has high thermal energy (hot). Valve 366 enables flow of water from the heat exchanger 332 to the ice-slush reservoir 362 when the water has low thermal energy (cold). Valve 372 enables flow of steam from the steam reservoir to the turbine 370. Electrical energy can be generated by spinning the turbine with steam.

Figure 4:
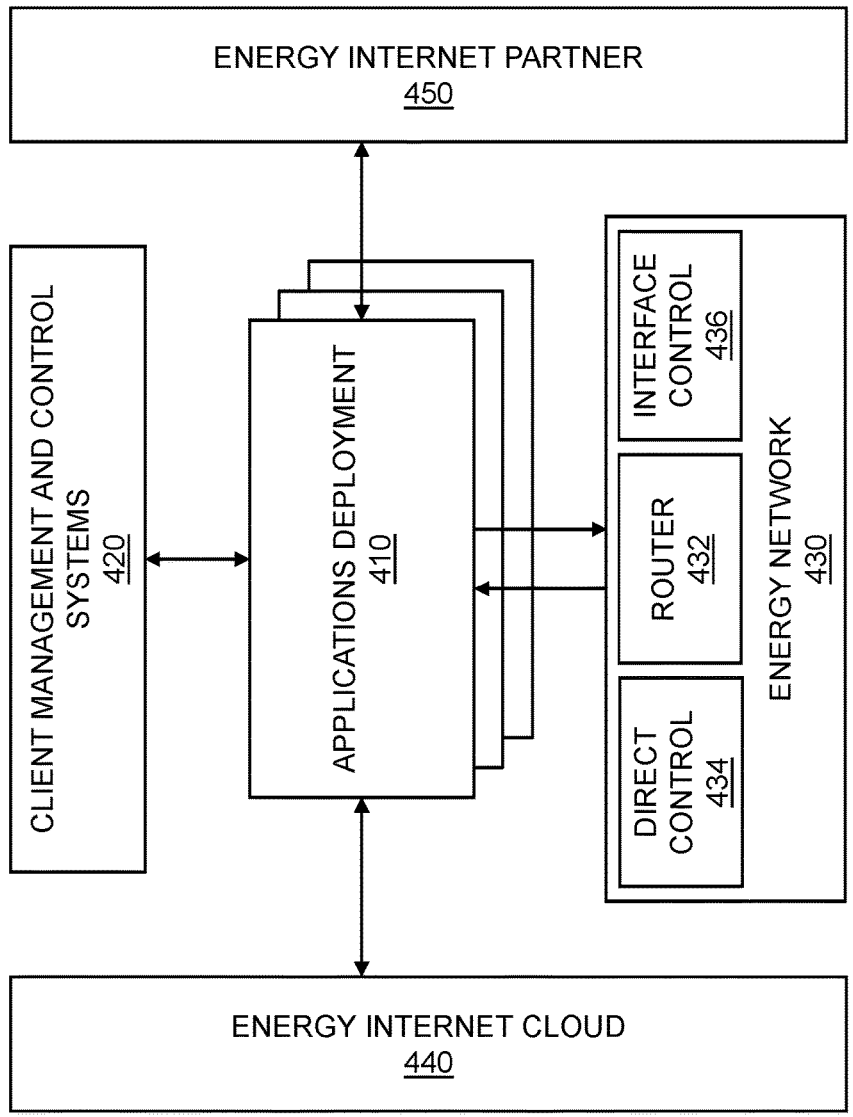
FIG. 4 illustrates an energy internet block diagram.

FIG. 4 illustrates an energy internet block diagram. An energy internet 400 enables power management across point of source to point of load. Data is obtained at a time of energy generation and includes both information on the energy and metadata about the energy. Connection is enabled from points of energy generation to large-scale storage. Load information is received from loads connected to an energy grid. An energy control policy is calculated, and routing of energy is controlled from points of generation to points of load. The energy internet can include applications deployment 410. The applications deployment for an energy internet can include a cluster, where the cluster includes one or more application programming interfaces (APIs) for handling data, policies, communications, control, and so on. The data can include energy storage, pump-turbine storage, energy from water power, grid energy, etc. The data can include information from energy generators, partners, and so on. The data can further include third-party data from parties including energy consumers such as oil rigs; solar, wind, tidal, or wave-action farms; datacenters; and the like.

Applications deployment can communicate with client management and control systems 420. The management can include infrastructure management, microgrid management, operating management, automated controls, and so on. The management can include management of client legacy equipment. The communicating between applications deployment and client management and control systems can include collecting data from one or more points of energy generation, one or more points of energy load, etc. The communicating can further include sending one or more energy control policies. The energy control policies can be based on the energy, energy information, energy metadata, availability of a large-scale energy storage subsystem, and the like. The energy internet can include an energy network 430. The energy network can include one or more energy routers 432, direct control 434, interface control 436, and so on. An energy router 430 can include digital switches for routing energy from a point of energy generation to a point of energy load. An energy router can be coupled to one or more direct control 434 sensors for detecting switch status, point of source status, point of load status, etc. An energy router can be coupled to direct control actuators for steering energy from one or more points of source to a given point of load. An energy router can be further connected to one or more third-party interface control 436 sensors and third-party interface control actuators. The interface control sensors and interface control actuators can be coupled to equipment such as legacy equipment which may not be directly controllable.

The energy internet (EI) can include an energy internet cloud 440. The energy internet cloud can include an energy internet ecosystem, an energy internet catalog, and so on. The energy internet cloud can include an energy internet secure application programming interface (API) through which the EI cloud can be accessed. The EI ecosystem can include third-party applications such as an application or app store, app development and test techniques, collaboration, assistance, security, and so on. The EI cloud can include an EI catalog. The EI catalog can include technology models, plant and equipment information, sensor and actuator data, operation patterns, etc. The EI cloud can include tools or "as a service" applications such as learning and training, simulation, remote operation, and the like. The energy internet can include energy internet partners 450. The EI partners can provide a variety of support techniques including remote management, cloud support, cloud applications, learning, and so on.

Figure 5:
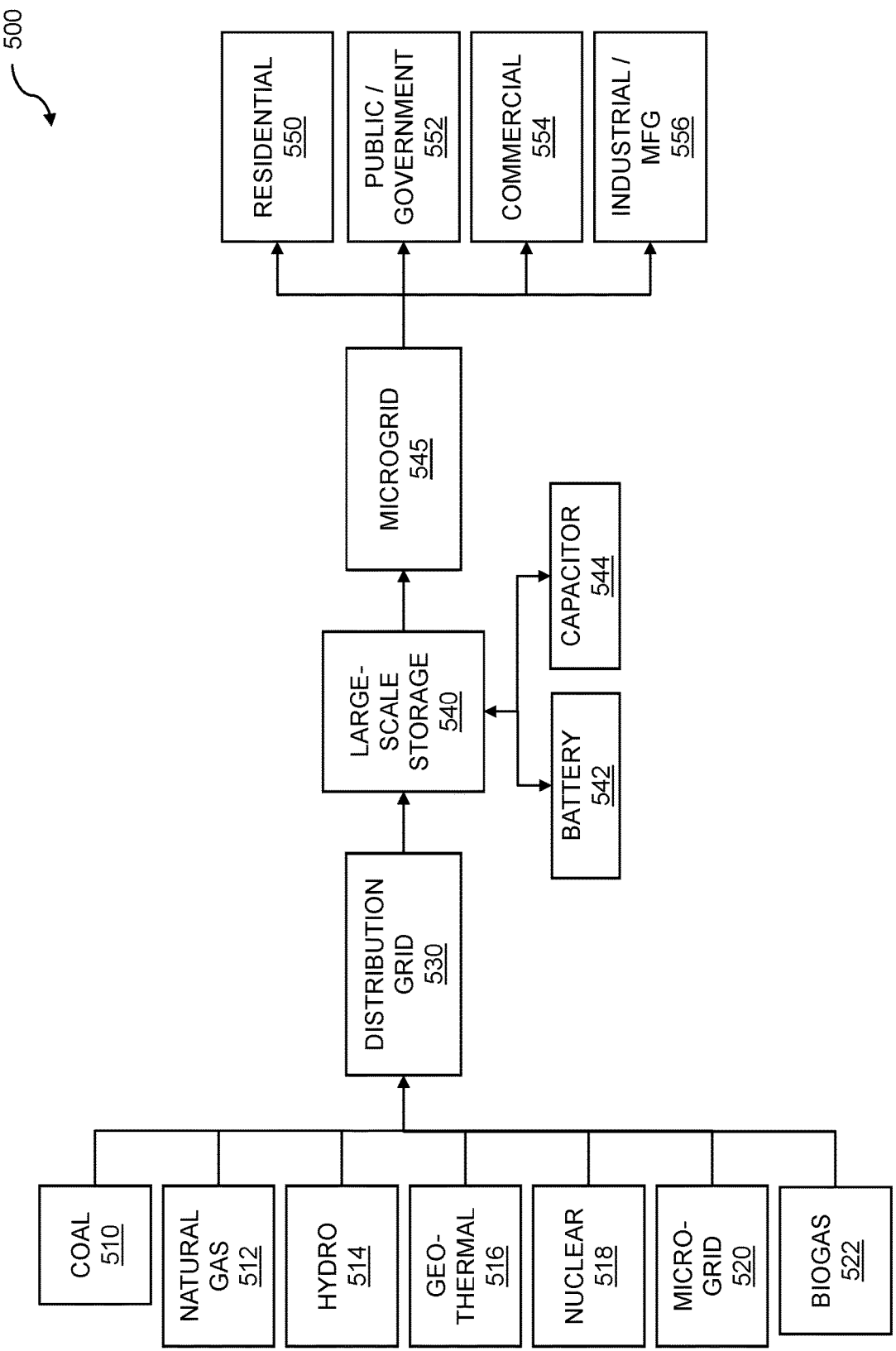
FIG. 5 shows energy internet points.

FIG. 5 shows energy internet points 500. The energy internet points can include energy sources, distribution, storage, routing, control, loads, and so on. The energy internet supports power management across point of source. A point of source can produce, recover, or extract energy, while the point of load can consume energy. Energy is obtained from points of energy generation. Data obtained at a time of energy generation includes information on energy and metadata about the energy. Connections are enabled from the energy points of generation to a large-scale energy storage subsystem. The connection can include an energy grid, a microgrid, etc., and the connection can be software-defined. That is, the energy routings and connections can be changed via software control. Load information is received from points of load, where the points of load are connected to the energy grid. Processors are used to calculate an energy control policy based on information on the energy, the energy metadata, availability of the large-scale energy storage subsystem, and the load information from one or more points of load. Routing of energy from the points of energy generation to the points of load is controlled based on the energy control policy.

The energy internet points can include a variety of energy sources. Energy sources can include commercially generated power, renewable or ecofriendly power, locally generated power, and so on. The energy sources can include coal 510, natural gas 512, hydro 514, geothermal 516, nuclear 518, microgrid 520 such as solar, micro-hydro, wind, tidal, wave-action, biogas 522, etc. The energy internet points can include a distribution grid 530. The distribution grid can include a local electrical power grid such as a local grid from a power plant (e.g. a hydro dam owned by a municipality), a regional distribution grid throughout a state or group of states, a national distribution grid through a country, and so on. The energy internet points can include large-scale storage 540. The large-scale storage can include storage of various types including electrical energy, potential energy, kinetic energy, hydrostatic energy, and so on. The large-scale energy storage system can include electrical energy storage using batteries 542 or capacitors 544. The large-scale energy storage can include pump-energy storage, compressed gas storage, liquid storage such as hydraulic head, steam, liquid nitrogen, ice, and so on. The energy internet points can include points of load connected via an energy microgrid 542 that is local to the large-scale energy storage 540. In some embodiments, the distribution grid 530 and the microgrid 542 comprise the same energy grid. The points of load can include a variety of devices, systems, buildings, establishments, and so on, that can consume energy such as electrical energy. The points of load can include residential loads 550 such as houses, cottages, camps, barns, or outbuildings; public or governmental loads 552 such as public libraries, town offices, or highway department buildings; commercial loads 554 such as shops, stores, boutiques, or retail spaces; industrial or manufacturing loads 556 such as chemical plants, petroleum processing facilities, automobile assembly lines, electronics manufacturers, etc.

Figure 6A:
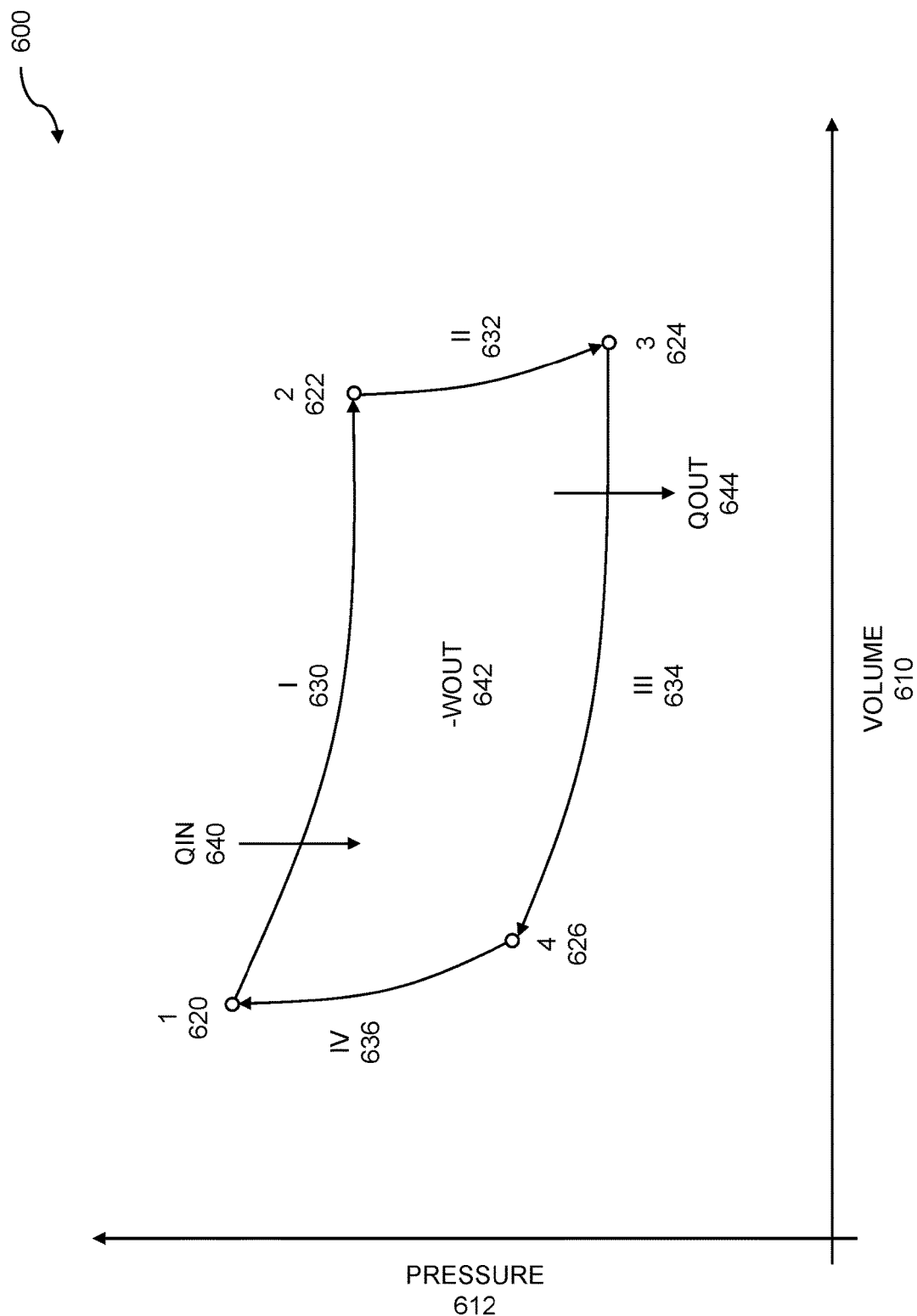
FIG. 6A illustrates adiabicity in a heat transfer cycle.

FIG. 6A illustrates adiabicity in a heat transfer cycle. An adiabatic process can occur when neither heat nor mass of a material is transferred between a given thermodynamic system and the environment surrounding the thermodynamic system. "Adiabicity" can describe a quality of the adiabatic process. For the techniques described herein, an adiabatic process with adiabicity equal to zero percent is described as perfectly isothermal, while an adiabatic process with adiabicity equal to 100 percent is described as perfectly adiabatic. Adiabicity in a heat transfer cycle supports energy storage and management using piping. An energy source is connected to a pump-turbine energy management system, where the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, where the energizing enables energy recovery. Energy is recovered from the pump-energy storage subsystem using a pump-turbine recovery subsystem enabled by the one or more valves that were energized.

An isothermal adiabatic process can be achieved by adding heat to an endothermic portion of the cycle, such as expansion, and/or extracting heat from an exothermic portion of the cycle, such as compression. Excess heat and excess cooling, both of which would normally be wasted and would move a process out of an isothermal cycle, can be harnessed using a waste-heat recovery subsystem that includes one or more heat exchangers. In embodiments, the one or more heat exchangers enable converting water to steam. The water to steam conversion can be accomplished by spraying cold water into an exothermic process to maintain isothermality in an adiabatic system. In embodiments, the one or more heat exchangers enable converting water to ice. The water to ice conversion can be accomplished by spraying hot water into an endothermic process to maintain isothermality in an adiabatic system. In an adiabatic system, $PV^\gamma = k$, where P is pressure, V is volume, k is a constant of adiabicity, and gamma ($\gamma$) is a volumetric exponent that typically ranges from 1 to 1.4, where $\gamma=1.0$ represents an isothermal or near isothermal process and $\gamma=1.4$ represents an adiabatic or near adiabatic process. As can be appreciated by one skilled in the art, perfectly isothermal or adiabatic processes are not practiced in typical thermodynamic structures, but processes can nonetheless be referred to as "isothermal" or "adiabatic" when they approach the theoretical limits within 10% to 30%.

The figure shows a pressure-volume (PV) diagram 600. A PV diagram can be used to show changes in pressure 612 versus volume 610 for one or more thermodynamic processes. A cycle, such as a heat transfer cycle, can be based on the one or more thermodynamic processes. One lap around the cycle can complete the cycle, where the completed cycle can result in no net change of system state. With reference to the PV diagram, at the end or completion of the cycle, the thermodynamic system state returns to a pressure and a volume equal to the pressure and the volume of the system at the beginning of the cycle. Four states are shown: state 1 620, state 2 622, state 3 624, and state 4 626. Each state 1 through 4 represents a pressure and a corresponding volume. While four states are shown, other numbers of states may be present for a given cycle. A path between two states can represent a process. Four processes are shown: process I 630, process II 632, process III 634, and process IV 636. While four processes are shown, other numbers of processes may be present within a given cycle.

A given process can affect a system pressure, a system volume, or both a system pressure and a system volume. For the heat transfer cycle shown, the processes can be isothermal such as process I and process III, or adiabatic such as process II and process IV. In general, the four processes shown can include isothermal expansion, such as between points 1 and 2; reversible adiabatic or isentropic expansion, such as between points 2 and 3; reversible isothermal compression, such as between points 3 and 4; and reversible adiabatic or isentropic compression, such as between points 4 and 1. Using the first law of thermodynamics, for a closed system, an amount of internal energy of the closed system can be calculated based on a quantity of input heat, such as input heat qin 640 minus an amount of work performed by the system, such as -wout 642. Any heat removed from the system, such as output heat qout 644 can be determined to be equal to the quantity of input heat minus work.

Figure 6B:
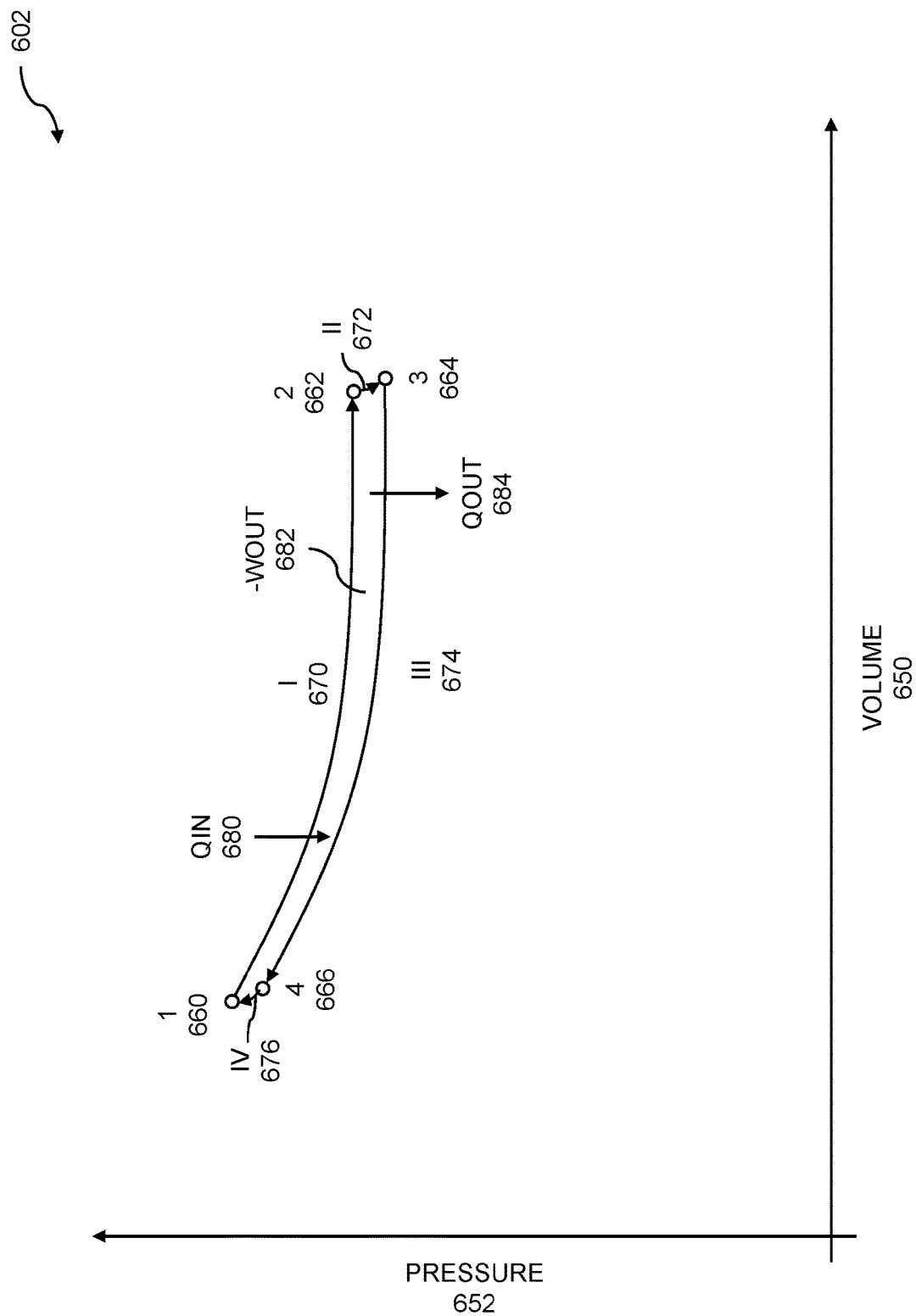
FIG. 6B illustrates an isothermal heat transfer cycle.

FIG. 6B illustrates an isothermal heat transfer cycle. A cycle of a thermodynamic system can include one or more thermodynamic processes. The thermodynamic processes can include isothermal processes and adiabatic processes. When the adiabicity of adiabatic processes is nearly equal to zero, then the thermal dynamic system can be described approximately as an isothermal system. An isothermal heat transfer thermodynamic system can support energy storage and management using piping. An energy source is connected to a pump-turbine energy management system. The pump-turbine energy management system includes a pump-energy storage subsystem. Energy from the energy source is stored in the pump-energy storage subsystem. Processors are used to calculate a valve-based flow control setting for recovering energy from the pump-energy storage subsystem. Valves in the pump-energy management system are energized to enable energy recovery. Energy is recovered from the pump-energy storage subsystem using a pump-turbine recovery subsystem enabled by the energized valves.

A pressure-volume (PV) diagram is shown in the FIG. 602. The PV diagram can plot pressure versus volume, and can show one or more states, where each state 1 through 4 comprises a pressure 652 and a corresponding volume 650. Four states are shown: state 1 660, state 2 662, state 3 664, and state 4 666. While four states are shown, other numbers of states may be present for a given cycle. A path between two states can represent a process. A process can include an isothermal process or an adiabatic process. A given process can impact the thermodynamic system by changing pressure, volume, or both pressure and volume. Four processes are shown: process I 670, process II 672, process III 674, and process IV 676. While four processes are shown, other numbers of processes may be present within a given cycle. For the isothermal heat transfer cycle shown, process I and process III can be isothermal. The adiabatic processes, process II and process IV can be as close to zero possible. The adiabatic processes II and IV can have an adiabicity nearly equal to zero. Recall that for a closed thermodynamic system, an amount of internal energy of the closed system can be calculated based on a quantity of input heat, such as input heat qin 680 minus an amount of work performed by the system, such as -wout 682. Any heat removed from the system, such as output heat qout 684 can be determined to be equal to the quantity of input heat minus work.

Figure 7:
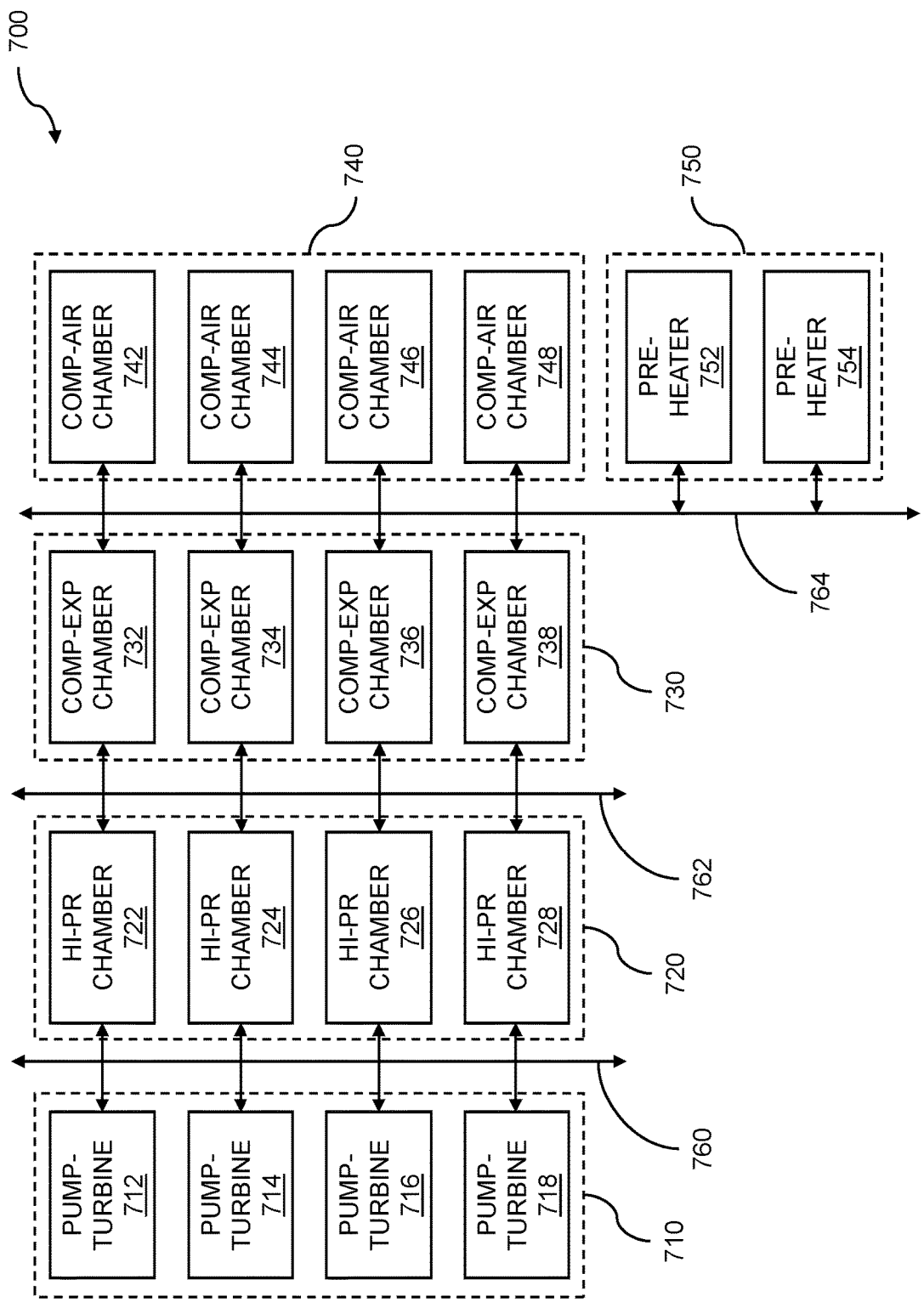
FIG. 7 shows energy storage pooling with architectural modularity.

FIG. 7 shows energy storage pooling with architectural modularity. Pooling of energy modules, which can include energy module peers, supports energy storage and management. Energy storage pooling 700 enables an energy management system to adapt based on changing energy demands, the number of various energy module peers available, and so on. The pooling enables the energy management system to operate using a quantity of energy modules appropriate to meeting energy needs. States of the energy modules can include different states of operation such as on or off, a percentage of maximum capacity, etc. The energy modules can be operated with substantially similar or different parameters such as pressures, temperatures, flowrates, and so on. The energy modules can be added to or removed from the energy system while the system is "hot". That is, the module additions or subtractions can be made without disrupting operation of the energy system. This "hot swapping" of modules can also be used to support maintenance of the energy modules.

An example including energy storage pooling with architectural modularity is shown. The architecture can include various energy module peers. The energy module peers can include one or more pump-turbine peers 710, high-pressure chamber peers 720, compression-expansion chamber peers 730, or compressed-air chamber peers 740. The pooling of the types of peers can include modules comprising one or more peers. The pump-turbine peers 710 can include pump-turbines 712, 714, 716, and 718; the high-pressure chamber peers 720 can include high-pressure chambers 722, 724, 726, and 728; the compression-expansion peers 740 can include compression-expansion chambers 732, 734, 736, and 738, and the compressed-air chamber peers can include compressed-air chambers 742, 744, 746, and 748. The architectural modularity of the energy system can enable addition or subtraction of peers as the capabilities of the peers are needed to meet energy demands. An example of the architectural modularity includes preheater peers 750. The preheater peers can include preheater 752 and preheater 754. The preheaters can include an external fuel supply for each peer (not shown). The various architectural modules can be interconnected. The interconnections, such as interconnections 760, 762, and 764, can include one or more interconnections between architectural modules. The interconnections can include pipes for transporting gases or liquids, cables for transferring charge, and so on.

Figure 8:
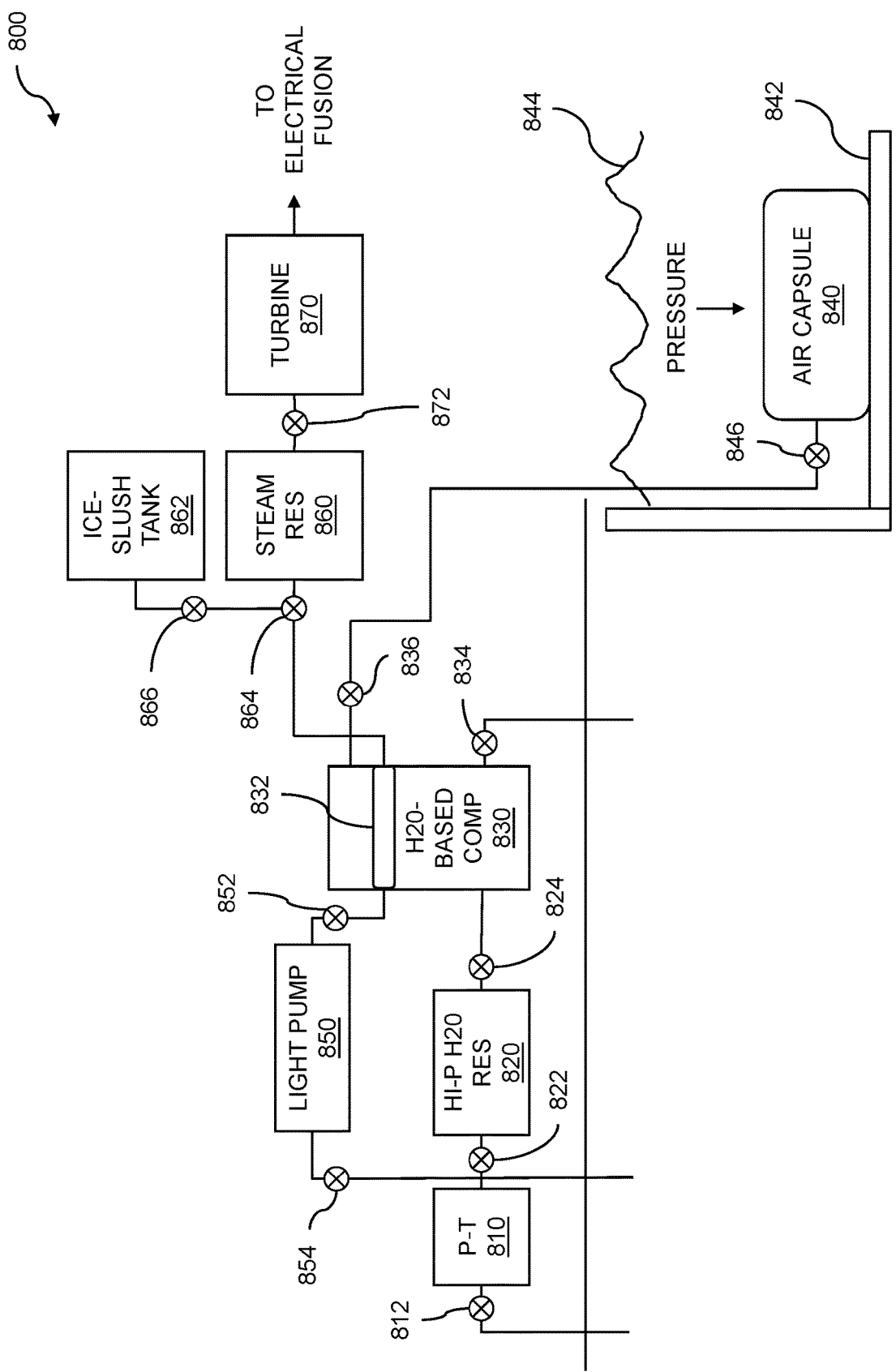
FIG. 8 illustrates pump-energy storage.

FIG. 8 illustrates pump-energy storage 800. Pump-energy storage supports energy storage and management using pumping. Pump-energy storage comprises various modules which can store energy of various types. The types of energy that can be stored can include electrical energy, thermal energy, kinetic energy, mechanical energy, and so on. Pump-energy storage can include a pump-turbine 810. The pump-turbine can be used to pressurize a storage vessel such as a tank, capsule, bladder, and so on. The pump-turbine can be operated electrically to move or pressurize a liquid or gas. The pump-turbine can also be operated by releasing pressure from the storage vessel for stored energy extraction. The pump-energy storage can include a high-pressure water reservoir 820. The high-pressure water reservoir can be used to provide pressurized water which can exert pressure on a gas such as air, nitrogen, etc. The pump-energy storage can include water-based high compression 830. The water-based high compression can be accomplished with a vessel such as 830, where water (at the bottom of the vessel) is isolated from a gas such as air (at the top of the vessel) by an interface, barrier, membrane, sack, and so on. The high-pressure water from the high-pressure water reservoir can be used to increase the volume of pressurized water in 830 thus increasing the pressure of the air. The water-based compression can include a heat exchanger 832. As the pressure of the air at the top of 830 is increased, the temperature of the air can be increased. The exchanger can be used to extract and store that waste heat from the air. A light pump 850 can be used to move the heat extracted from the water-based compression. In embodiments, the heat exchanger can include a water heat exchanger. The light pump can move the heated water for storage.

The pump-energy storage can include an air capsule 840. The air capsule can be located on land, at the bottom of a body of water 842, beneath a seabed, in unused oil infrastructure such as an oil well, etc. The air capsule can be pressurized by hydraulic head. The hydraulic head can be determined by the distance between the surface of the body of water 844 and the bottom of the body of water 842. The body of water can include fresh water or seawater. In embodiments, the distance between the water surface and the bottom can be 100 meters or greater. The pump-energy storage can include storage for thermal energy. Thermal energy can be stored in a steam reservoir 860 as heat, in an ice-slush tank 862 as cold, and so on. The pump-energy storage can include a turbine 870. Steam from the steam reservoir can be used to spin a turbine to generate electricity. The generated electricity can be returned to an electrical grid, distributed to an electrical micro-grid, used on-site to meet energy demand, and so on.

The pump-turbine 810, high-pressure water tank 820, water-based high compression chamber 830, air capsule 840, ice-slush tank 862, steam reservoir 860, turbine 870, light pump 850, and other pump-energy storage elements, can be interconnected using pipes, lines, hoses, etc. The flow of air, water, steam, cold water (from the ice-slush), refrigerant, and so on, can be controlled by valves. Valve 812 enables water to enter or leave the pump-turbine 810. Valve 822 couples the pump-turbine to the high-pressure reservoir 820 for water flow. Valve 824 enables high-pressure water flow between the high-pressure water reservoir and the water-based compression chamber 830. Valve 852 enables liquid (water, refrigerant, etc.) to flow between the heat exchanger 832 and the light pump 850. Valve 854 enables liquid to enter or leave the light pump. Valve 834 enables water to enter (charge) or leave (discharge) the water-based compression chamber. Valves 836 and 846 enable the flow of pressurized air from the water-based compression chamber 830 to the submerged air capsule 840. Valve 864 enables flow of water from the heat exchanger 832 to the steam reservoir 860 when the water has high thermal energy (hot). Valve 866 enables flow of water from the heat exchanger 832 to the ice-slush reservoir 862 when the water has low thermal energy (cold). Valve 872 enables flow of steam from the steam reservoir to the turbine 870. Electrical energy can be generated by spinning the turbine with steam.

Figure 9A:
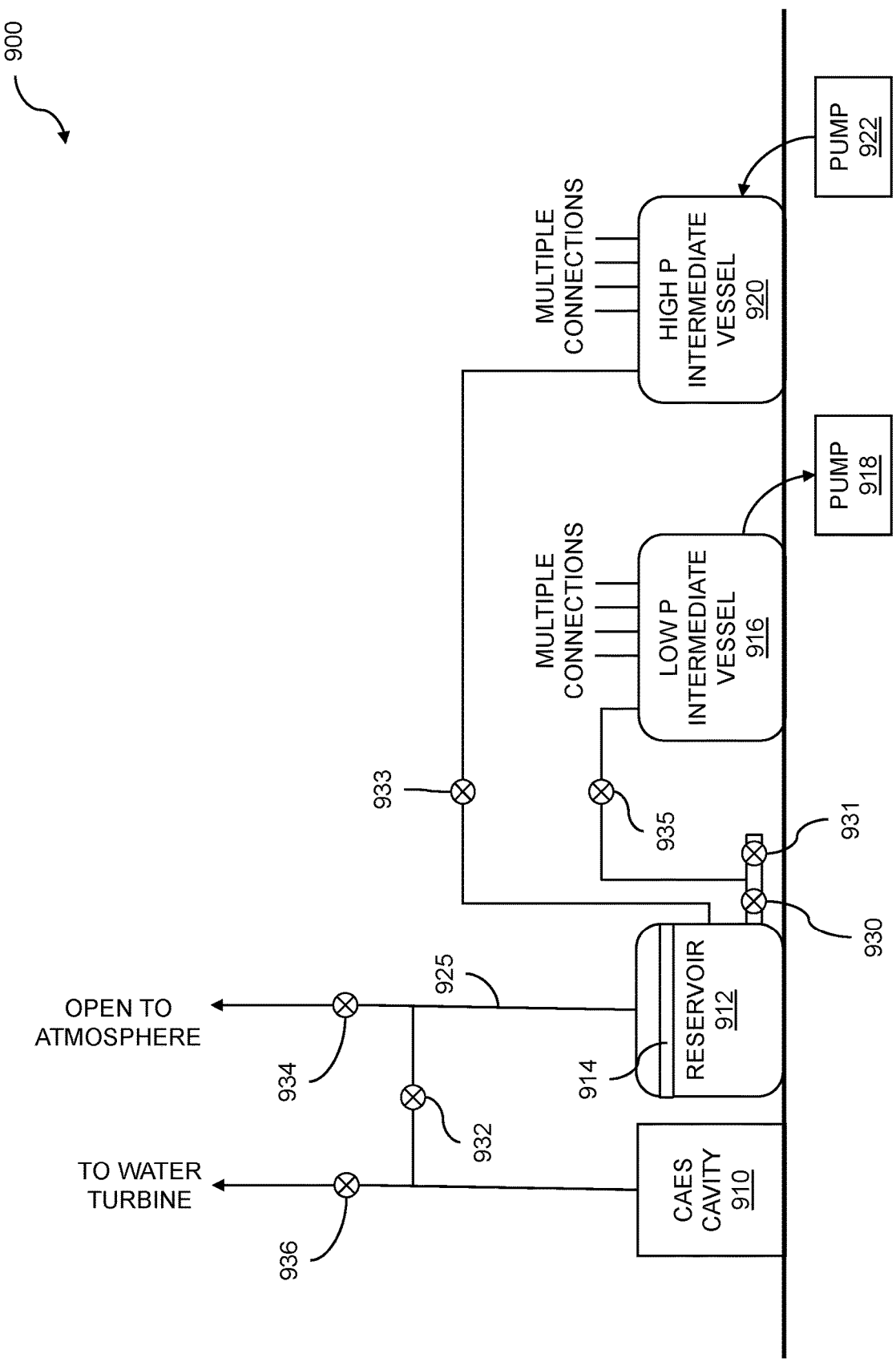
FIG. 9A illustrates charging operation for a compressed air energy system.

FIG. 9A illustrates charging operation for a compressed air energy system 900. The compressed air energy system supports energy storage and management using pumping. An energy source is connected to a pump-turbine energy management system, where the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, where the energizing enables energy recovery. Energy is recovered from the pump-energy storage subsystem using a pump-turbine recovery subsystem enabled by the one or more valves that were energized. The reservoir 912 can be a pressure rated vessel which can be insulated to minimize heat losses from the vessel. In embodiments, the vessel is insulated from the inside. More than one vessel or reservoir can be used. All pressure vessels can be similarly insulated.

Reservoir 912 is an example of a plurality of reservoirs which can operate in parallel or in tandem as dictated by the operating software. In a usage example, a starting point can include the reservoir 912 full of air at atmospheric pressure. If the reservoir 912 is situated below water level, water can be introduced through valves 930 and 931. When the water level has reached its equilibrium, 930 and 931 will be closed and pump 922 will be used to introduce additional water into reservoir 912 through an intermediate vessel 916. If reservoir 912 is situated above water, pump 922 alone will introduce water into reservoir 912. The purpose of vessel 920 is to connect a single pump to a plurality of vessels similar to 912. The plurality of vessels can serve the same purpose as vessel 912. Pumped water can push the air into 912 and can increase its pressure. The increasing pressure in 912 can further cause the temperature of air in 912 to increase. The heat exchanger 914 can recover this heat of compression by converting water into steam or by converting some other working fluid from liquid into vapor. The heat exchanger 914 may be internal or external to the reservoir 912. The heat exchanger can be contained within line 925. When the pumped water has compressed air in 912 to a set-point, the valve 932 can open and send the compressed air to a compressed air energy system (CAES) cavity 910. This sending of compressed air can be done directly or through another heat recovery device such as an Organic Rankine Cycle (ORC) or conventional heat exchanger. When the air is transferred and pressure in 912 equals pressure in 910, valves 932 and 933 can be closed. Valves 934 and 935 can be opened. Pump 918 can pump the water from 912 to the environment and by doing so can thereby reduce the water level in 912. When the water level reaches a lower level set-point, valves 934 and 935 can close and pump 918 can shut off. Reservoir 912 can be filled with atmospheric air, thus returning to the initial starting point. The process may be repeated until the pressure in CAES 910 has reached target pressure. Valve 936 can be opened to supply water to a water turbine.

Figure 9B:
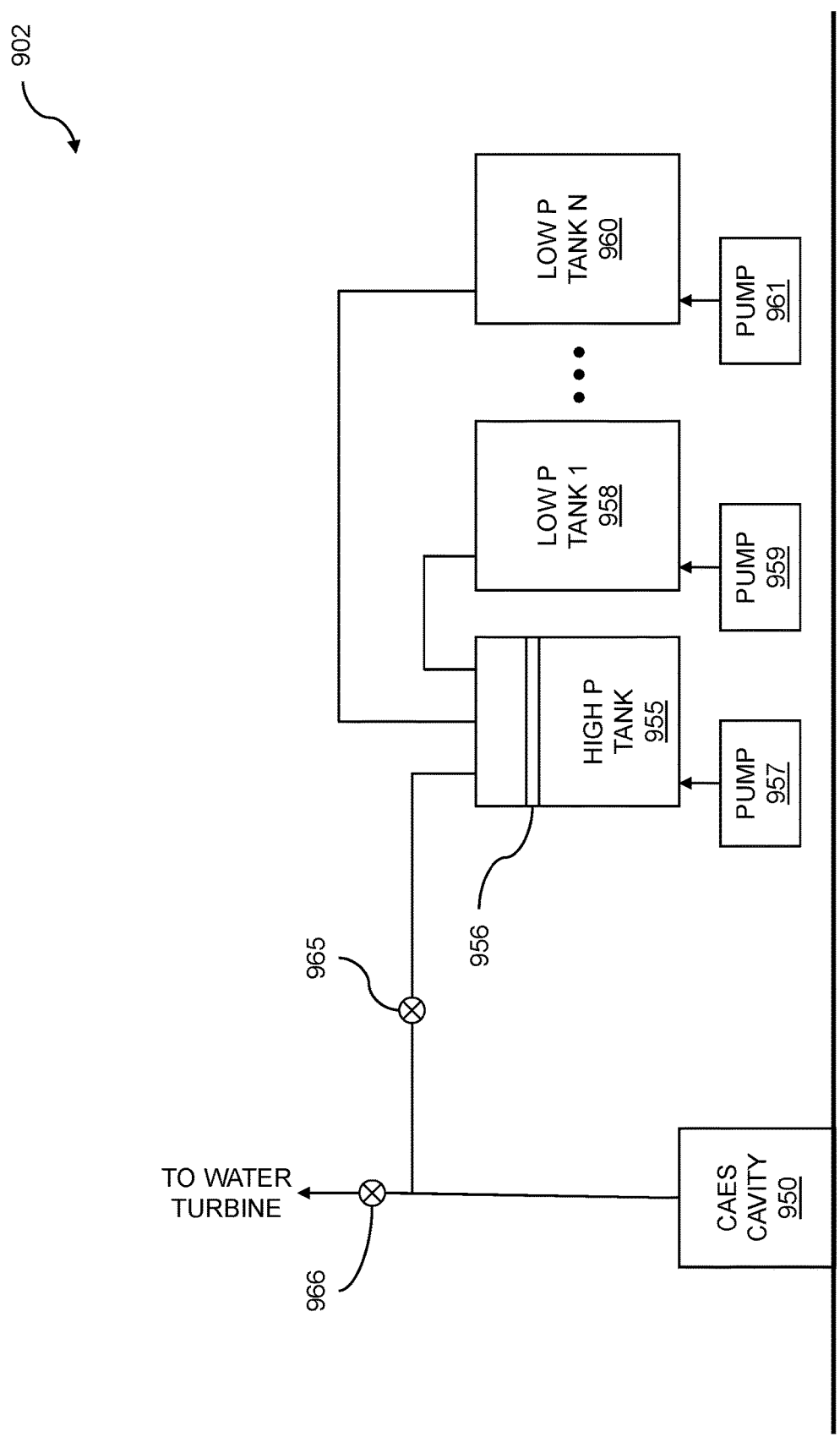
FIG. 9B illustrates multiple cells for unit cell operation.

FIG. 9B illustrates multiple cells for unit cell operation 902. Unit cell operation supports energy storage and management using pumping. A pressure vessel of high capacity can be implemented by coupling one or more vessels to form a unit cell. A plurality of low-pressure tanks, represented here by 958 and 960, can be charged with water in the manner as described elsewhere. The tanks can feed air into a high-pressure tank 955. The pressure in Tank 955 can increase from 1 atmosphere to approximately (n+1) atmospheres. When a pressure threshold or target has been achieved, the heat exchanger 956 can start using the heat of compression to convert working fluid such as water from liquid to vapor or steam. The pump 957 can pump water into 955 to increase the pressure to a set-point. Similarly, pump 959 can pump water into 958 to increase the pressure to a set-point; or pump 961 can pump water into 960 to increase the pressure to a set-point. The heat exchanger 956 can continue to extract heat resulting from compressing air. When the set-point is reached, the valve 965 to the CAES cavity can open so that air can be pushed into the cavity 950. This pushing of the air can be done directly or through another heat recovery device such as an ORC or conventional heat exchanger. The compressing and heat extraction can be repeated. When pressurized air within the CAES is needed for energy generation, valve 965 can be closed and valve 966 can be open. The pressurized air within the CAES can be directed to a turbine, used to pressurize water for a water turbine, and so on.

The steam or vapor produced in the heat exchanger can be pooled with steam/vapor produced by a plurality of heat exchangers. The pooled steam/vapor can be used to spin steam turbines to drive conventional generators to produce electricity. The hot pressurized air can be pre-cooled prior to admitting the hot pressurized air into the CAES cavity 950, thus heating the water or the working liquid prior their conversion into steam or vapor to generate electricity. The pre-cooling or the heating can be accomplished using a conventional heat exchanger. When the electricity demand is higher than the available supply, or when the pricing is economically favorable, a software operating system can send a signal to switch from energy storage mode to energy harvest or recovery mode.

Figure 9C:
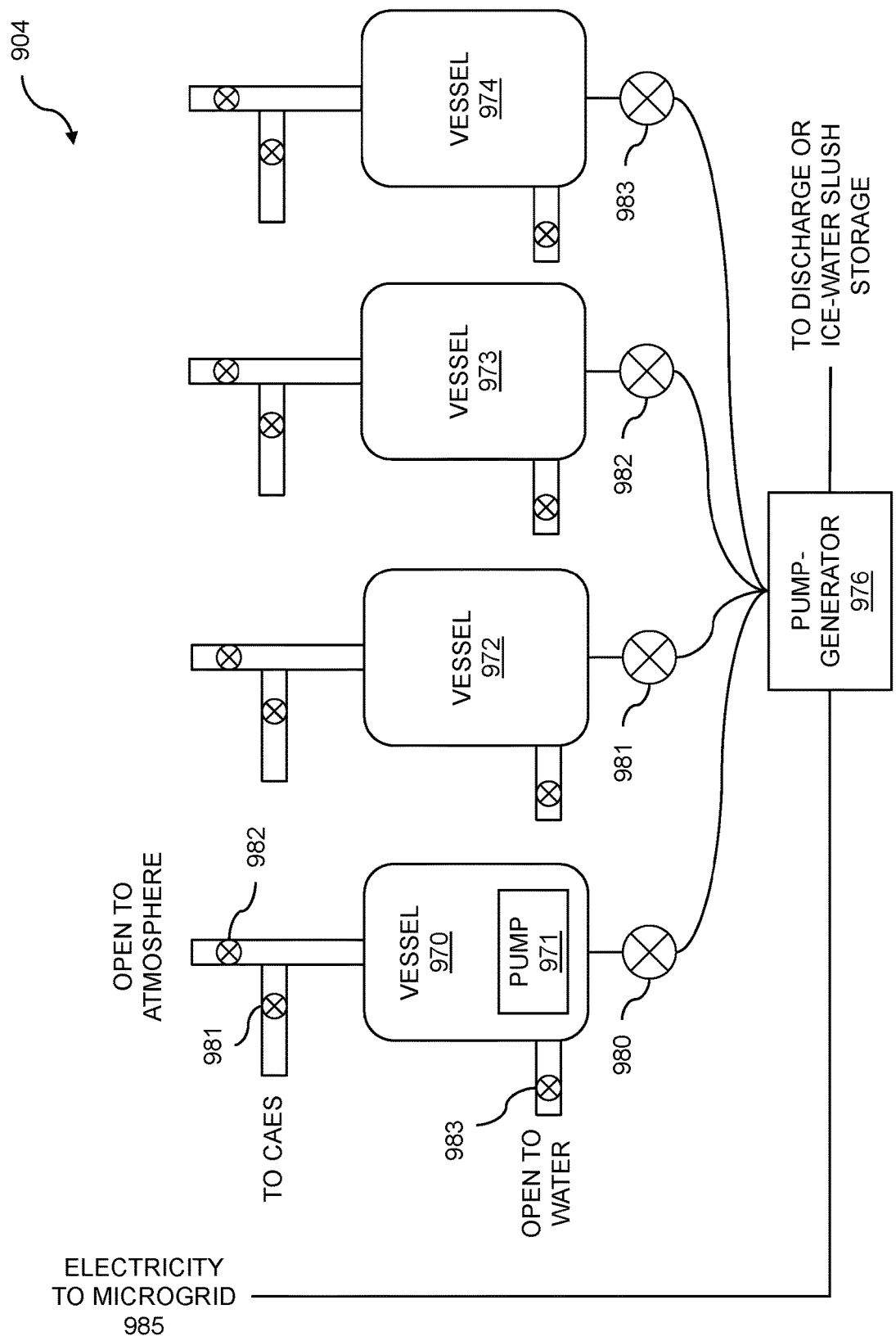
FIG. 9C illustrates power generation using expanding air.

FIG. 9C illustrates power generation using expanding air 904. Expanding air, steam, liquids, and so on can be used for power generation. The power generation supports energy storage and management using pumping. Vessels 970, 972, 973, and 974 can represent a plurality of vessels working in concert as directed by a software operating system. The software operating system can be used to control the generation of energy such as electrical power from expanding air or another gas. A usage example for Vessel 970 is described. Initially, a vessel 970 is full of air at atmospheric pressure. Valve 982 can be open. Valves 983 and 980 can be closed. Water can be introduced in the tank through valve 983 until the water level within the tank reaches a high-level set-point. Valves 982 and 983 can be closed. Valve 981 can be opened and can be used to pressurize the vessel 970. When the pressure within the vessel equals that in a CAES, such as the CAES previously described, valve 981 can be closed. Valve 980 can be opened and can be used to drive the high-pressure water through the pump-generator 976. The spinning of the pump-generator can be used for generating electrical energy. Similarly, valves corresponding to the other vessels can be opened to drive the high-pressure pump-generator. Thus, valve 981 can be opened to permit high-pressure water within vessel 972 to be directed to the pump-generator; valve 982 can be opened to permit high-pressure water within vessel 973 to be directed to the pump-generator; or valve 983 can be opened to permit high-pressure water within vessel 974 to be directed to the pump-generator. More than one vessel may be so connected to the pump-generator. The electrical energy that is generated can be distributed to a distribution network such as an electricity microgrid 985.

As water is being discharged from 970, the temperature of air in 970 can start to decrease. The decrease in temperature of the air can be rapid and significant. When the water level reaches a set-point, an internal pump 971 can start spraying the water into the air space. The spraying of the water can result in heating of the air in the air space, by the sensible heat of water and by the latent heat of fusion. Water can be converted to ice (solid phase) or to ice-water slush (aqueous phase). The ice-water slush can be transferred to a separate holding vessel. Within the separate holding vessel, the ice-water slush from the plurality of vessels can be pooled. The ice-water slush can be used to provide refrigeration or cooling for other uses by the CAES system.

Figure 10:
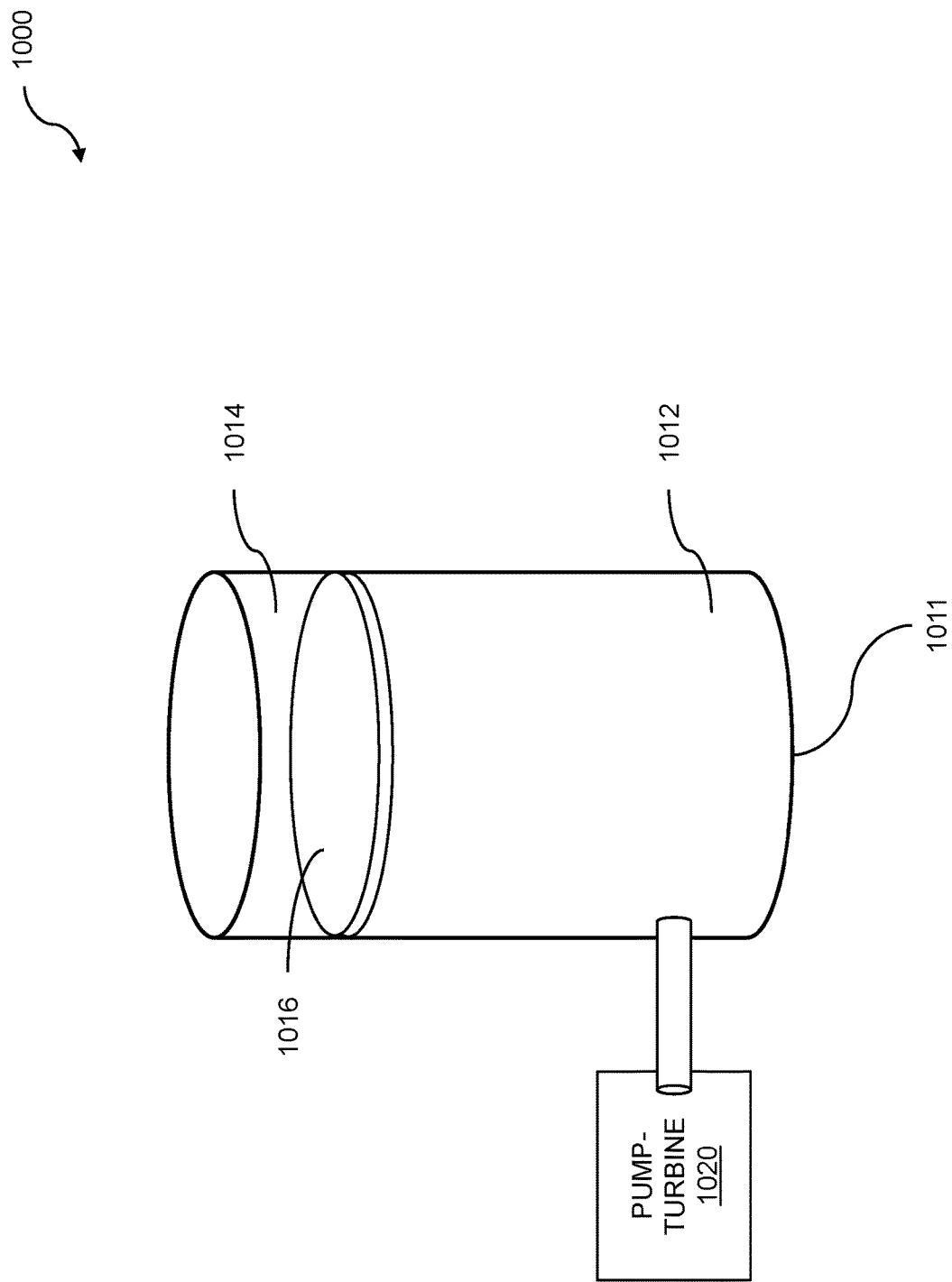
FIG. 10 shows a high-pressure water reservoir.

FIG. 10 shows a high-pressure water reservoir 1000. Water or another fluid can be pumped into a high-pressure water reservoir using a pump-turbine or other technique. The high-pressure water can be stored, used to provide water to a water-based high-compression chamber, released to spin the turbine of the pump-turbine, etc. The high-pressure water reservoir can support energy storage and management using pumping. A high-pressure water reservoir can include a vessel such as a cylinder 1011, a tank, a sphere, and so on. The high-pressure water reservoir can include water 1012 or another liquid, air 1014 or another gas, and a membrane, diaphragm, or other structure 1016 used to separate the liquid from the gas. The liquid and the gas can be separated to prevent mixing, diffusion, etc. Liquid pumped into the high-pressure water reservoir by a pump-turbine 1020, pump, or other technique, causes the air or other gas to compress, thereby exerting pressure on the liquid. The water in the high-pressure water reservoir can be released from the reservoir back to the pump-turbine. The released water causes the turbine to spin, where the spinning turbine can be used to convert the hydraulic pressure of the high-pressure water to another energy form such as electrical energy.

Figure 11:
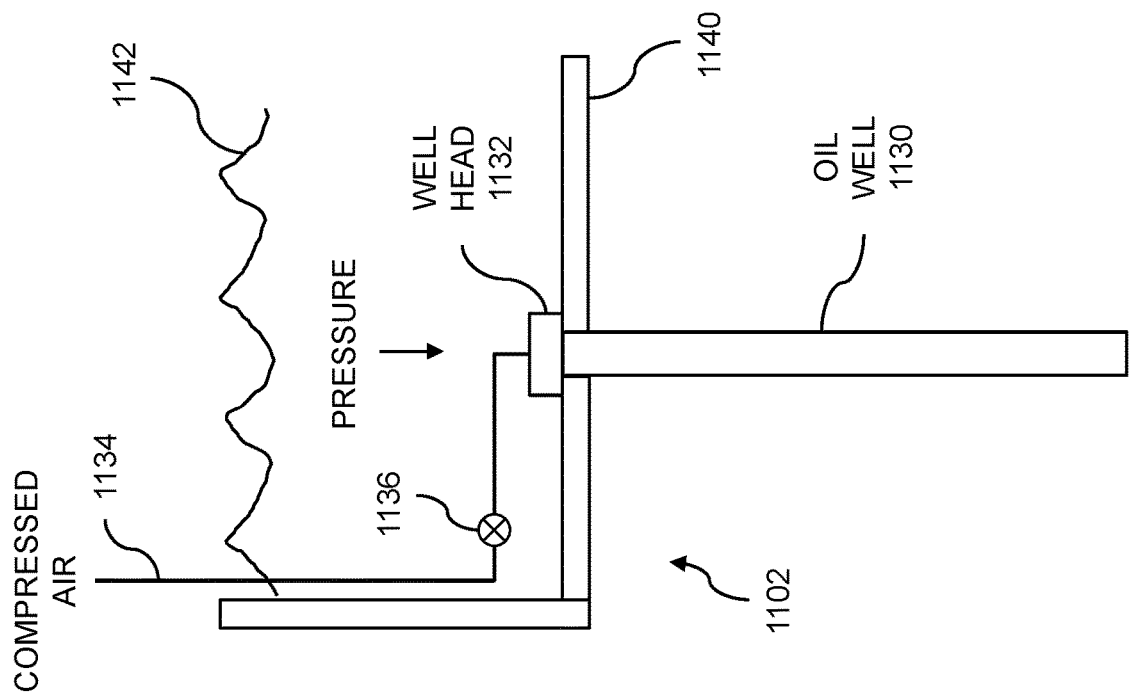
FIG. 11 illustrates underwater pressurized-air storage.
Figure 11:
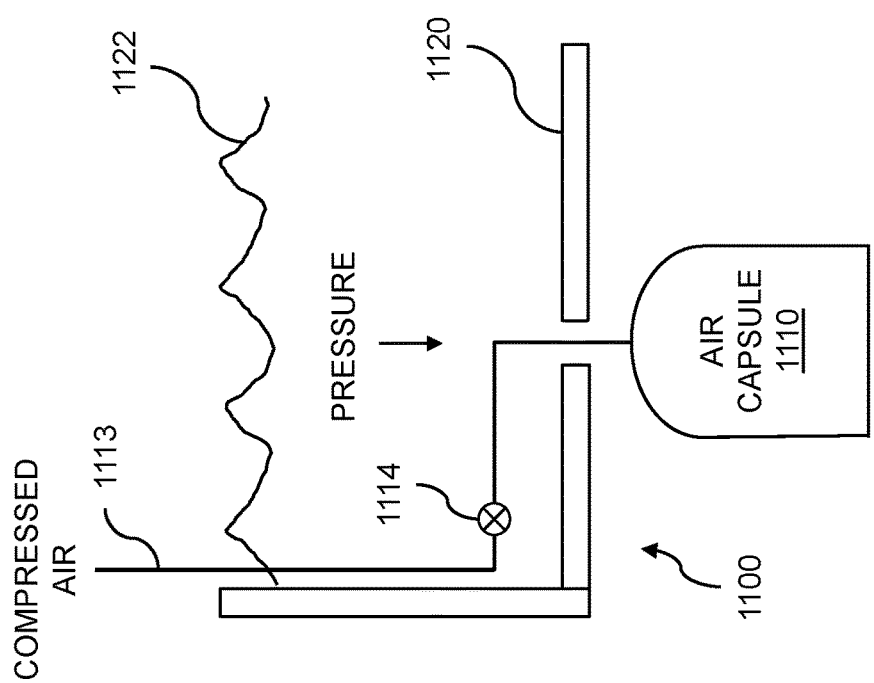

FIG. 11 illustrates underwater pressurized-air storage. A pressurized gas such as air, nitrogen, carbon-dioxide, and so on, can be used by a storage subsystem of an energy storage management system. The pressurized-air storage can support energy storage and management using pumping. Various types of storage vessels can be used to store a pressurized gas. Storage techniques such as pressurized bladders, pressurized accordion-fold bags, expandable bags or balloons, expandable containers, and so on, have been described elsewhere. Pressurized-air storage can also be accomplished using a rigid structure such as a vessel, where the vessel can be implemented using a variety of geometric shapes. An example vessel comprising an air capsule 1110 is shown for pressurized-air storage 1100. The air capsule can be located at the bottom of a body of water, where the body of water can include fresh water or salt water. The air capsule can be located on a lakebed or seabed 1120, at the bottom of a river, and so on. The air capsule can be located beneath the lakebed or seabed. The height of the water above the air capsule can be determined by the difference between the surface 1122 of the body of water and the bed 1120. The pressure created by that water height or hydraulic head may be used to pressurize the air capsule, depending on the structure of the air capsule (e.g. rigid, flexible, expandable, etc.). The air capsule can be accessed by a feedline or pipe 1113 and a valve 1114. The pipe and value can be used by a pump or compressor to provide compressed air or another compressed gas to the air capsule.

A second structure for underwater pressurized-air storage 1102 is shown. A pump-turbine energy management system based on underwater pressurized-air storage can be implemented within a non-productive oil well infrastructure. A non-productive oil well 1130 and well head 1132 can be used as a vessel for storage of the pressurized-air or other gas. Again, a height of water above the well head can be determined by computing the distance between the surface of the body of water 1142 and the bed 1140 of the body of water. The height of water or hydraulic head can exert pressure on the well head of the oil well. The water pressure may be used to exert pressure on the oil well for pressurized-air storage. Pressurized-air or another gas can be stored in the non-productive oil well infrastructure using a feedline or pipe 1134 and valve 1136. The pressurized-air can include atmospheric air, nitrogen, carbon dioxide, etc. The pressurized-air or other gas can be pumped into the oil well and later removed from the oil well to be used for energy recovery.

Figure 12:
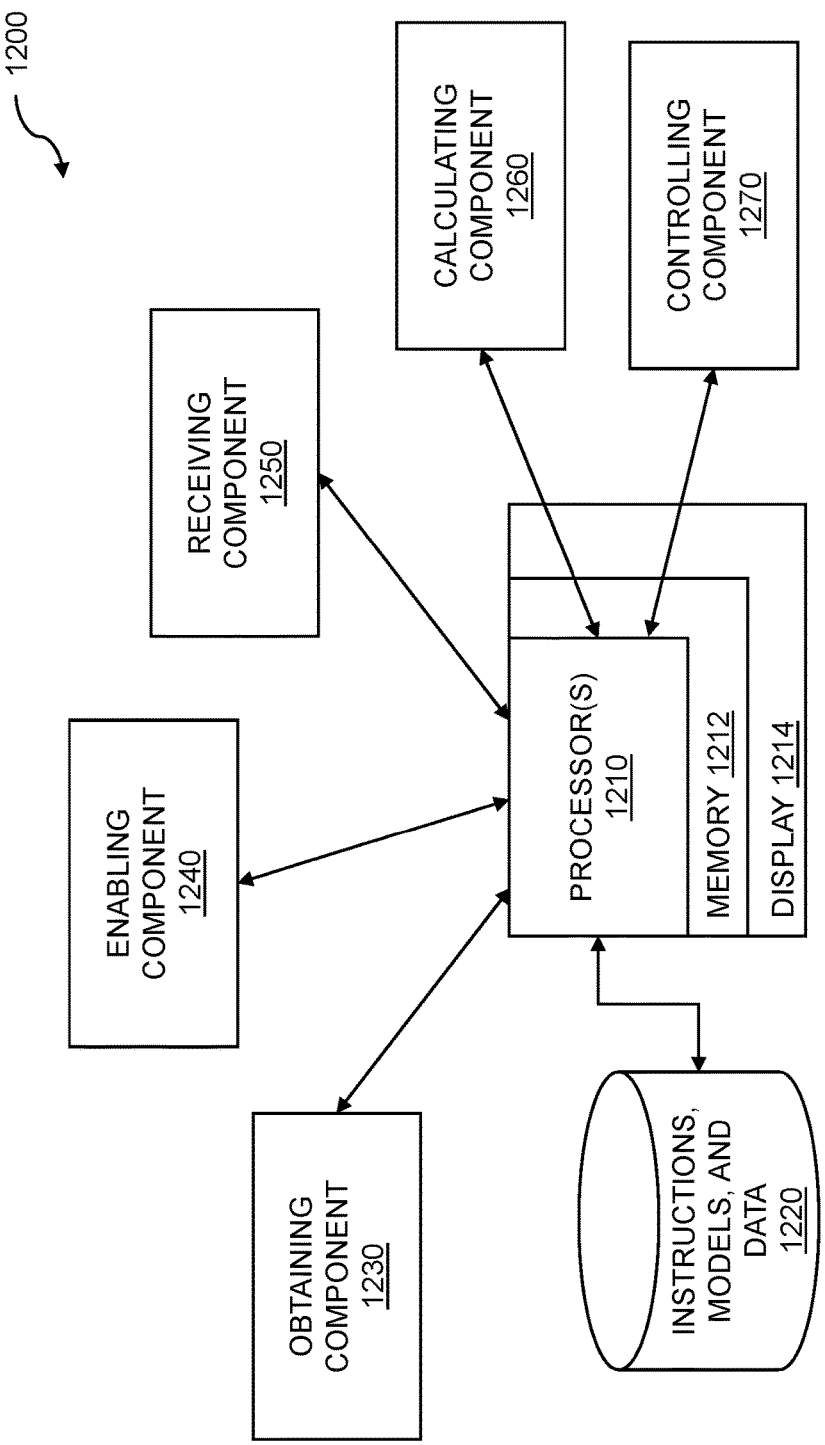
FIG. 12 is a system diagram for power management across point of source to point of load.

FIG. 12 is a system diagram for power management across point of source to point of load. Energy is obtained from one or more points of energy generation. The points of energy generation can include diverse and disparate energy sources such as coal-fired generation, natural gas generation, hydrogeneration, geothermal generation, nuclear generation, and so on. The points of energy generation can include backup energy generation such as energy from a diesel-generator set; renewable energy generation from solar, wind, tidal, or wave-action generation; micro-grid generation from local or onsite sources such as biogas generation; and so on. Data obtained at a time of energy generation includes information on energy such as amount of power available, time of availability, cost, etc. Data obtained at a time of energy generation includes metadata about the energy. Metadata about the energy can include name of the energy source, location of the energy source, owner or agent of an energy source, energy source preferences such as ecofriendly energy sources, and the like. Connection is enabled from the one or more points of energy generation to a large-scale energy storage subsystem, where the connection includes an energy grid. The energy grid can include a local, regional, or national distribution network for energy. The energy grid comprises digital switches which replace analog switches. The energy grid can be software-defined. The energy that is stored can include electrical energy, potential energy, kinetic energy, hydrostatic energy, and so on. The large-scale energy storage system can include electrical energy storage using batteries or capacitors, pump-energy storage, compressed gas storage, liquid storage such as hydraulic head, steam, liquid nitrogen, ice, and so on.

Load information is received from one or more points of load, where the one or more points of load are connected to the energy grid. The points of load can include residential power loads, public or government loads, commercial loads, industrial or manufacturing loads, and so on. One or more processors are used to calculate an energy control policy, based on information on the energy, the energy metadata, availability of the large-scale energy storage subsystem, and the load information from one or more points of load. The energy control policy can be used in determining which energy loads may be connected to one or more energy sources. The energy control policy can be based on one or more priorities for the energy loads. The energy policy can include a time period during which the energy policy is valid. The time period can be a short-term basis, where a short-term basis can include an integer number of seconds, minutes, or days, substantially less than a week, and so on. The time period can be a long-term basis, where a long-term basis can include an integer number of weeks, months, seasons, or years, and where the integer number of weeks, months, seasons, or years include a length of time that can be substantially more than one day. Routing of the energy from the one or more points of energy generation to the one or more points of load is controlled based on the energy control policy. The controlling can include energizing one or more digital switches to route energy from one or more energy sources to a given load. The routing can be updated based on changing energy control policies, elapsing time periods during which a given energy control policy is valid, and so on.

The system 1200 can include one or more processors 1210 and a memory 1212 which stores instructions. The memory 1212 is coupled to the one or more processors 1210, wherein the one or more processors 1210 can execute instructions stored in the memory 1212. The memory 1212 can be used for storing instructions; for storing databases of energy subsystems, modules, or peers for system support; and the like. Information regarding power management across point of source to point of load can be shown on a display 1214 connected to the one or more processors 1210. The display can comprise a television monitor, a projector, a computer monitor (including a laptop screen, a tablet screen, a netbook screen, and the like), a smartphone display, a mobile device, or another electronic display. The system 1200 includes instructions, models, and data 1220. The data can include information on energy, metadata about energy, and the like. In embodiments, the instructions, models, and data 1220 are stored in a networked database, where the networked database can be a local database, a remote database, a distributed database, and so on. The instructions, models, and data 1220 can include instructions for obtaining operating data from a plurality of energy modules, one or more operating goals for the plurality of energy modules, instructions for analyzing operating data, instructions for controlling the operation of energy modules, etc.

The system 1200 includes an obtaining component 1230. The obtaining component 1230 can obtain energy from one or more points of energy generation. The points of energy operation can include grid power sources such as power plants fueled by coal, natural gas, nuclear sources, hydropower, geothermal power, biogas, and so on. Data that can be obtained at time of energy generation can include information on energy and metadata about the energy. The information on energy can include source, cost, availability, etc. The metadata about energy can include name of the energy source, location of the energy source, owner or agent or an energy source, energy source preferences such as ecofriendly energy sources, etc. The system 1200 includes an enabling component 1240. The enabling component 1240 can enable connection from the one or more points of energy generation to a large-scale energy storage subsystem. In embodiments, the connection can include an energy grid. An energy grid coupled to one or more energy sources can be separate from an energy grid coupled to one or more loads. Connection between one or more energy grids can be software defined. The various power generation sources can be connected from a local, regional, or national grid, from an on-site micro-grid, and so on, to the large-scale energy storage subsystem. The energy can be stored directly or converted to other forms of energy. In embodiments, the energy is stored as electrical energy in batteries, capacitors, and so on. In other embodiments, the energy is stored as compressed gas or liquid, compressed air, ice, liquid nitrogen, and the like. The system 1200 includes a receiving component 1250. The receiving component 1250 can receive load information from one or more points of load, where the one or more points of load are connected to the energy grid. The points of load can include electrical energy loads associated with various uses such as residential, public and government, commercial, industrial and manufacturing, and so on.

The system 1200 includes a calculating component 1260. The calculating component 1260 can calculate, using one or more processors, an energy control policy, information on the energy, the energy metadata, availability of the large-scale energy storage subsystem, and the load information from one or more points of load. The energy control policy can be used to prioritize routing of power from one or more points of power source to a given point of load. The energy control policy can prioritize routing of power based on energy source availability, energy source preferences such as grid or renewable, and so on. The energy control policy can be based on point of load priorities. The system 1200 includes a controlling component 1270. The controlling component 1270 can control routing of the energy from the one or more points of energy generation to the one or more points of load based on the energy control policy. The controlling can include energizing digital switches which can connect or steer power from one or more points of power source to one or more points of load. The routing can take place over an energy internet. The controlling routing can be based on a priority of a load such as a high priority load or a low priority load, time of day, day of week, day of month, season, processing job mix, and so on. Embodiments include controlling the large-scale energy storage subsystem based on the energy control policy. The controlling the large-scale energy storage subsystem can include determining how much energy to store, how much energy can be withdrawn from storage for short-term or long-term use, etc. In other embodiments, the controlling includes controlling access to the one or more energy points of generation based on the energy control policy, such that a high priority load is given first access to a power source. In further embodiments, the at least one of the one or more points of load are controlled based on energy availability. Energy availability can include availability of grid power, availability of renewable power such as the sun shining for solar power, the wind blowing for wind power, and so on.

Disclosed embodiments can include a computer program product embodied in a non-transitory computer readable medium for energy management, the computer program product comprising code which causes one or more processors to perform operations of: obtaining energy from one or more energy points of generation, wherein data obtained at time of energy generation includes information on energy and metadata about the energy; enabling connection from the one or more points of energy generation to a large-scale energy storage subsystem; receiving load information from one or more points of load, wherein the one or more points of load are connected to an energy grid; calculating an energy control policy, based on information on the energy, the energy metadata, availability of the large-scale energy storage subsystem, and the load information from one or more points of load; and controlling routing of the energy from the one or more energy points of generation to the one or more points of load based on the energy control policy.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method for energy management comprising:
   obtaining energy from one or more points of energy generation, wherein data obtained at time of energy generation includes information on energy and metadata about the energy;
   enabling connection from the one or more points of energy generation to a grid-connected energy storage subsystem;
   receiving load information from one or more points of load, wherein the one or more points of load are connected to an energy grid;

calculating an energy control policy, based on information on the energy, the energy metadata, availability of the grid-connected energy storage subsystem, and the load information from one or more points of load; and controlling routing of the energy from the one or more points of energy generation to the one or more points of load based on the energy control policy.

2. The method of claim 1 further comprising controlling the grid-connected energy storage subsystem based on the energy control policy.

3. The method of claim 2 wherein the grid-connected energy storage subsystem includes compressed air energy storage.

4. The method of claim 3 wherein the compressed air is compressed using one or more water pumps.

5. The method of claim 1 further comprising controlling access to the one or more points of energy generation based on the energy control policy.

6. The method of claim 5 wherein the one or more points of energy generation include a renewable energy source.

7. The method of claim 6 wherein the renewable energy source includes one or more of a solar farm, a wind turbine farm, a tidal energy system, a wave energy system, a geothermal system, a biogas, or a bio-fuel system.

8. The method of claim 1 further comprising storing and recovering energy from the grid-connected energy storage subsystem.

9. The method of claim 8 further comprising buffering energy recovered from the grid-connected energy storage subsystem using a battery storage subsystem.

10. The method of claim 8 further comprising buffering energy recovered from the grid-connected energy storage subsystem using capacitor storage.

11. The method of claim 8 further comprising providing energy recovered from the grid-connected energy storage subsystem to the energy grid.

12. The method of claim 11 further comprising controlling the at least one of the one or more points of load based on availability of the energy recovered.

13. The method of claim 1 wherein the at least one of the one or more points of load is controlled based on application-based availability requirements.

14. The method of claim 13 wherein the application-based availability requirements determine load time-of-day usage.

15. The method of claim 1 wherein the at least one of the one or more points of load is controlled based on load pricing requirements.

16. The method of claim 1 wherein the at least one of the one or more points of load is controlled based on energy availability.

17. The method of claim 1 wherein the at least one of the one or more points of load is controlled based on energy management policy requirements.

18. The method of claim 1 wherein the at least one of the one or more points of load is controlled based on energy distribution requirements.

19. The method of claim 1 wherein the at least one of the one or more points of load is controlled based on seasonal load requirements.

20. The method of claim 1 wherein the energy control policy changes dynamically.

21. The method of claim 1 wherein the controlling of routing is accomplished using digital switching techniques.

22. The method of claim 1 wherein a further energy control policy is used in the enabling connection of the grid-connected energy storage subsystem.

23. The method of claim 1 wherein the energy control policy is used to enable energy transfer between distinct energy microgrids.

24. A computer program product embodied in a non-transitory computer readable medium for energy management, the computer program product comprising code which causes one or more processors to perform operations of:

obtaining energy from one or more points of energy generation, wherein data obtained at time of energy generation includes information on energy and metadata about the energy;

enabling connection from the one or more points of energy generation to a grid-connected energy storage subsystem;

receiving load information from one or more points of load, wherein the one or more points of load are connected to an energy grid;

calculating an energy control policy, based on information on the energy, the energy metadata, availability of the grid-connected energy storage subsystem, and the load information from one or more points of load; and controlling routing of the energy from the one or more points of energy generation to the one or more points of load based on the energy control policy.

25. A computer system for energy management comprising:

a memory which stores instructions;

one or more processors coupled to the memory wherein the one or more processors, when executing the instructions which are stored, are configured to:

obtain energy from one or more points of energy generation, wherein data obtained at time of energy generation includes information on energy and metadata about the energy;

enable connection from the one or more points of energy generation to a grid-connected energy storage subsystem;

receive load information from one or more points of load, wherein the one or more points of load are connected to an energy grid;

calculate an energy control policy, based on information on the energy, the energy metadata, availability of the grid-connected energy storage subsystem, and the load information from one or more points of load; and control routing of the energy from the one or more points of energy generation to the one or more points of load based on the energy control policy.

* * * * *